(12) United States Patent
Tang et al.

(10) Patent No.: US 11,906,793 B2
(45) Date of Patent: Feb. 20, 2024

(54) OPTICAL CONNECTOR ASSEMBLY

(71) Applicant: 3M INNOVATIVE PROPERTIES COMPANY, St. Paul, MN (US)

(72) Inventors: Cheng Tang, Shanghai (CN); Shiwen Chen, Shanghai (CN); Changbao Ma, Austin, TX (US); Bing Hao, Woodbury, MN (US); Boon K. Lee, Leander, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 344 days.

(21) Appl. No.: 17/435,970

(22) PCT Filed: Mar. 26, 2019

(86) PCT No.: PCT/CN2019/079672
§ 371 (c)(1),
(2) Date: Sep. 2, 2021

(87) PCT Pub. No.: WO2020/191613
PCT Pub. Date: Oct. 1, 2020

(65) Prior Publication Data
US 2022/0146760 A1  May 12, 2022

(51) Int. Cl.
*G02B 6/38* (2006.01)
*G02B 6/40* (2006.01)

(52) U.S. Cl.
CPC ......... *G02B 6/3885* (2013.01); *G02B 6/3825* (2013.01); *G02B 6/3897* (2013.01);
(Continued)

(58) Field of Classification Search
CPC .... G02B 6/3825; G02B 6/3855; G02B 6/387; G02B 6/3885; G02B 6/3897; G02B 6/403
See application file for complete search history.

(56) References Cited

U.S. PATENT DOCUMENTS 7,637,673 B2   12/2009  Oike
8,511,910 B2    8/2013  Ohtsuka
(Continued)

FOREIGN PATENT DOCUMENTS

CN   101006374         7/2007
CN   101310204 A  * 11/2008  ............... G02B 6/36
(Continued)

OTHER PUBLICATIONS

International Search Report for PCT International Application No. PCT/CN2019/079672, dated Dec. 31, 2019, 4 pages.

*Primary Examiner* — Daniel Petkovsek
(74) *Attorney, Agent, or Firm* — Clifton F. Richardson

(57) ABSTRACT

An optical connector assembly (100) includes a housing (110), an optical ferrule (140); and an optical fiber array (150). The housing (110) has a mating end (111) and an opposite cable end (112) and includes: a first housing portion (120) including a front support (122) proximate the mating end (111) and a rear support (124) disposed between the front support (122) and the cable end (112); and a second housing portion (130) assembled to the first housing portion (120) and including a middle support (133) disposed between the front and rear supports (122,124). The ferrule (140) is supported by the front support (122). Front ends of optical fibers of the optical fiber array (150) are received by and attached to an attachment area of the ferrule (140). When the second housing portion (130) is assembled to the first housing portion (120), the middle support (133) of the second housing portion (130) contacts and bends the optical fiber array (150) about the middle support (133). The bend causes the optical ferrule (140) to rotate about the front support (122).

15 Claims, 28 Drawing Sheets

(52) U.S. Cl.
CPC ............ *G02B 6/387* (2013.01); *G02B 6/3855* (2013.01); *G02B 6/403* (2013.01)

(56) References Cited

U.S. PATENT DOCUMENTS

| | | | |
|---|---|---|---|
| 8,920,042 B2 | 12/2014 | Aoki | |
| 10,989,881 B2 | 4/2021 | Ma | |
| 2004/0071407 A1* | 4/2004 | Vergeest | G02B 6/3809 385/59 |
| 2010/0247039 A1 | 9/2010 | Ohtsuka | |
| 2011/0249943 A1 | 10/2011 | Case | |
| 2015/0247979 A1 | 9/2015 | Richmond | |
| 2017/0192182 A1 | 7/2017 | Peterson | |
| 2018/0128996 A1 | 5/2018 | Sawicki | |
| 2018/0217337 A1 | 8/2018 | Smith | |
| 2018/0239091 A1 | 8/2018 | Mathews | |
| 2018/0275353 A1 | 9/2018 | Haase | |
| 2018/0275355 A1 | 9/2018 | Haase et al. |
| 2018/0284354 A1 | 10/2018 | Smith | |
| 2019/0049671 A1 | 2/2019 | Haase | |

FOREIGN PATENT DOCUMENTS

| | | |
|---|---|---|
| CN | 101681000 | 3/2010 |
| CN | 101681001 | 3/2010 |
| CN | 102681102 | 9/2012 |
| CN | 202583527 | 12/2012 |
| CN | 103823278 | 5/2014 |
| CN | 206741024 | 12/2017 |
| JP | 2007011060 A | 1/2007 |
| JP | 2016534412 A | 11/2016 |
| JP | 2017513055 A | 5/2017 |
| JP | 2018534635 A | 11/2018 |
| WO | WO 2018-116135 | 6/2018 |
| WO | WO 2020-003117 | 1/2020 |
| WO | WO 2020-003124 | 1/2020 |
| WO | WO 2020-003245 | 1/2020 |

* cited by examiner

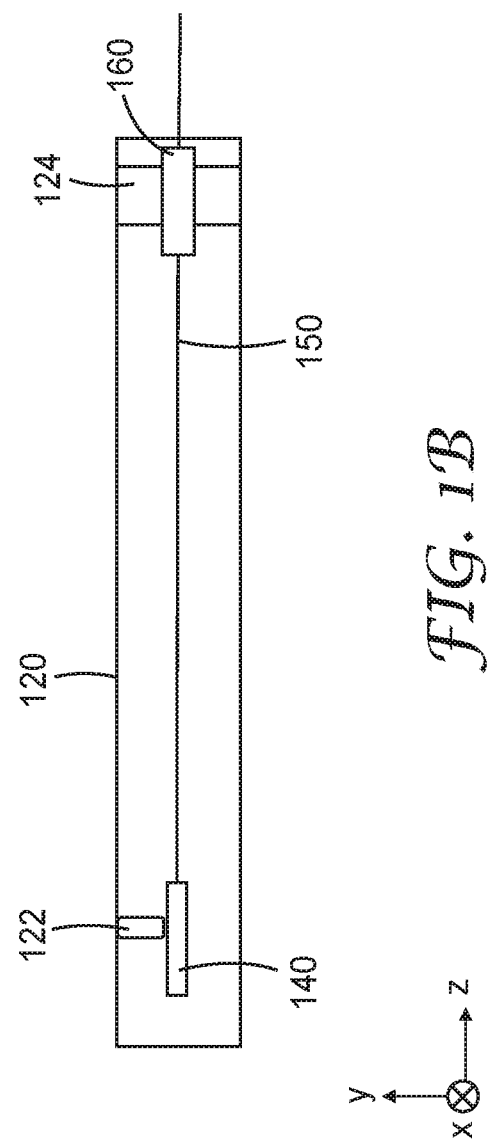

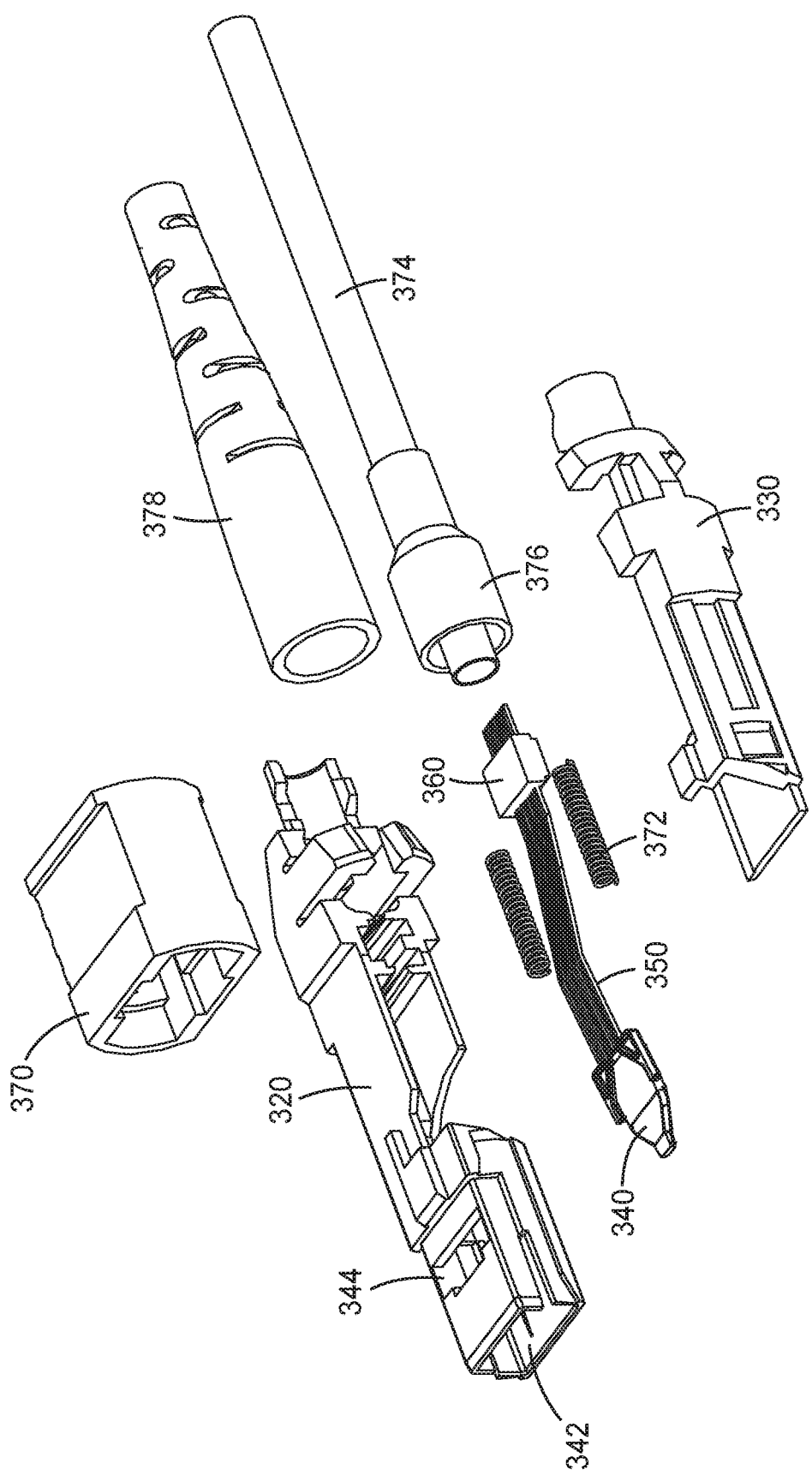

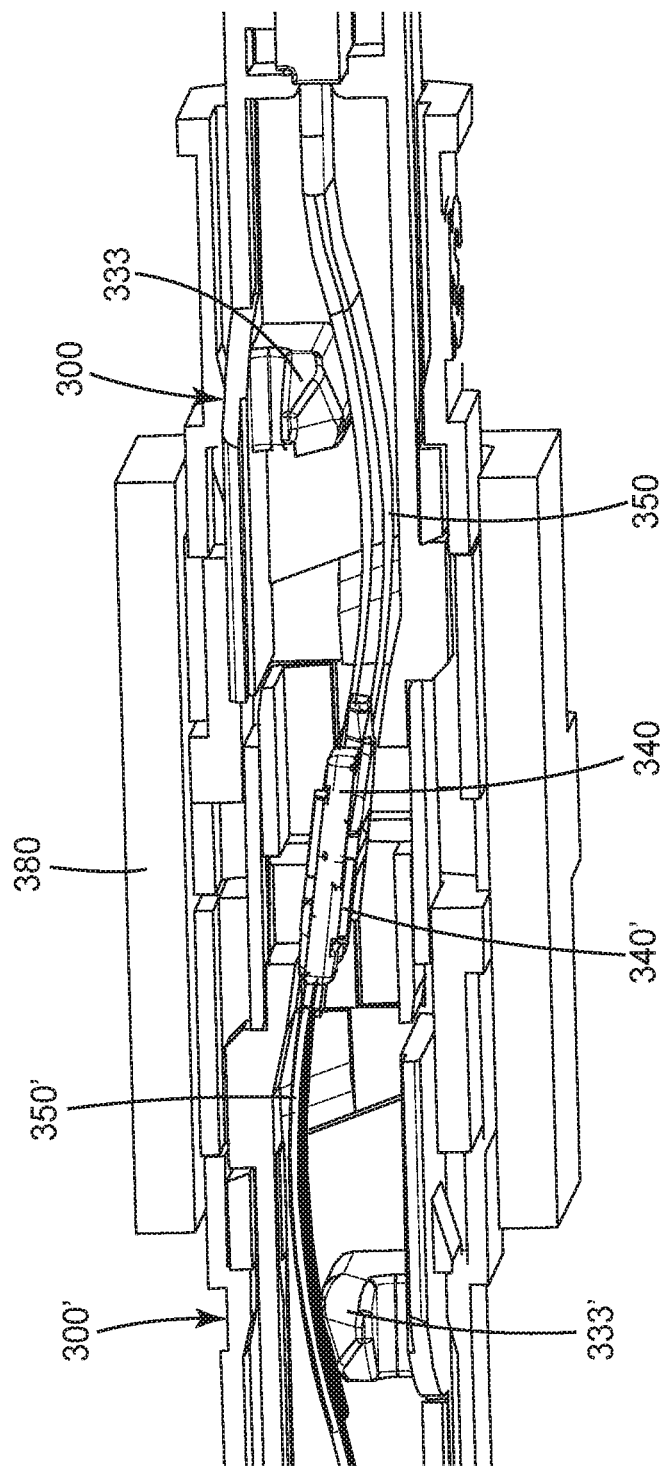

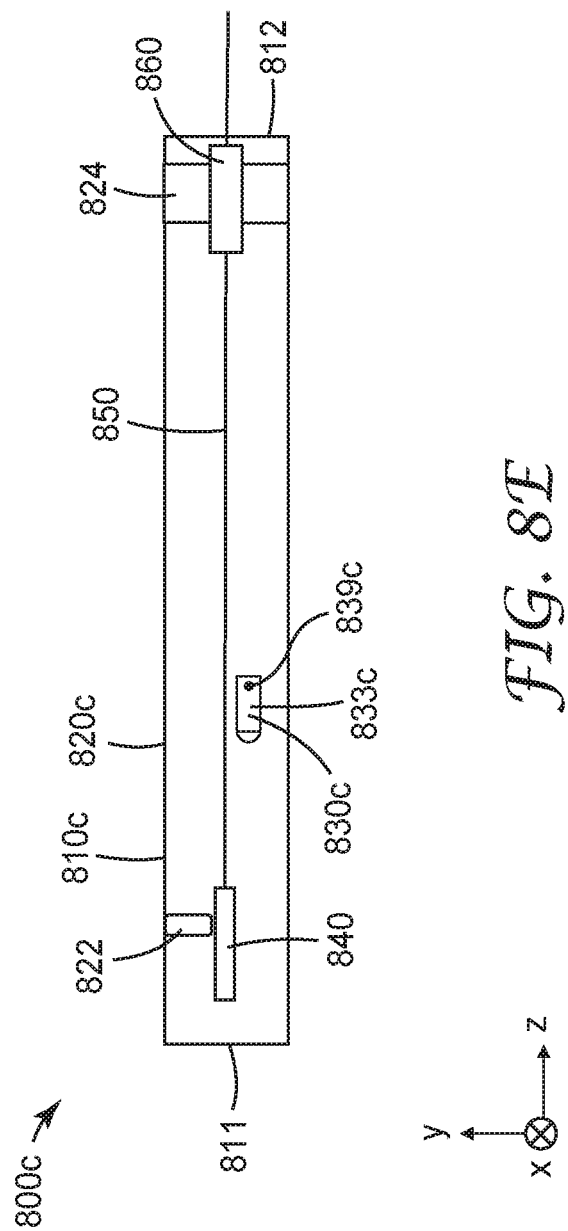

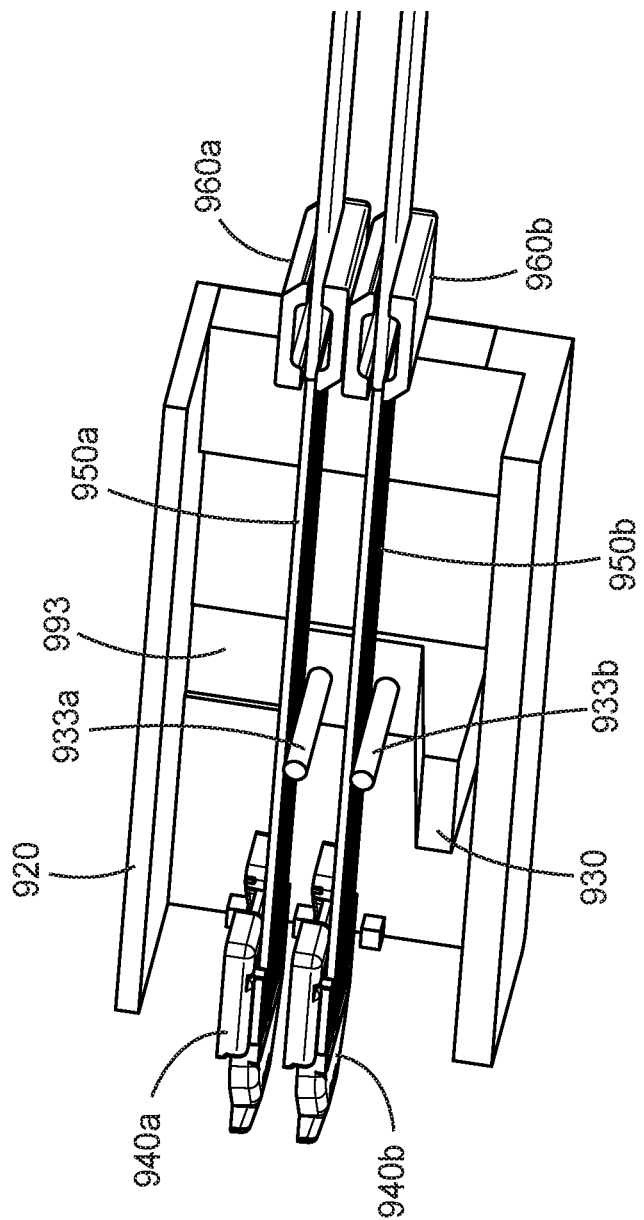

OPTICAL CONNECTOR ASSEMBLY

CROSS REFERENCE TO RELATED APPLICATIONS

This application is a national stage filing under 35 U.S.C. 371 of PCT/CN2019/079672, filed Mar. 26, 2019, the disclosure of which is incorporated by reference in its entirety herein.

BACKGROUND

Multi-fiber optical connectors are known for telecommunications and data center applications. Such connectors may use an optical ferrule which can receive a plurality of optical fibers.

SUMMARY

In some aspects of the present description, an optical connector assembly including a housing, an optical ferrule, and a substantially flat optical fiber array is provided. The housing has a mating end and an opposite cable end and includes: a unitary first housing portion including a front support proximate the mating end and a rear support disposed between the front support and the cable end; and a unitary second housing portion assembled to the first housing portion and including a middle support disposed between the front and rear supports of the first housing portion. The optical ferrule is supported by the front support of the first housing portion and includes: an attachment area for receiving a plurality of optical fibers; and a light redirecting side for changing a direction of light received from an optical fiber received in the attachment area. The substantially flat optical fiber array includes a plurality of optical fibers. Front ends of the optical fibers are received by and fixedly attached to the attachment area of the optical ferrule and the optical fiber array is fixedly attached to the rear support of the first housing portion, such that when the second housing portion is assembled to the first housing portion, the middle support of the second housing portion contacts and bends the optical fiber array about the middle support. The bend causes the optical ferrule to rotate about the front support of the first housing portion.

In some aspects of the present description, an optical connector assembly including a housing, an optical ferrule, and a substantially flat optical fiber array is provided. The housing has a mating end and an opposite cable end, and includes a front support proximate the mating end; a rear support disposed between the front support and the cable end; and a middle support disposed between the front and rear supports and configured to move between first and second positions. The optical ferrule is adjacent the front support of the housing and includes an attachment area for receiving a plurality of optical fibers; and a light redirecting side for changing a direction of light received from an optical fiber received in the attachment area. The substantially flat optical fiber array includes a plurality of optical fibers. Front ends of the optical fibers are received by and fixedly attached to the attachment area of the optical ferrule and the optical fiber array is fixedly attached to the rear support of the housing, such that when the middle support moves from the first position to the second position, the middle support contacts and bends the optical fiber array about the middle support. The bend causes the optical ferrule to rotate about the front support of the housing.

BRIEF DESCRIPTION OF THE DRAWINGS

FIG. 1B is a schematic cross-section view of the first housing portion of FIG. 1A prior to the assembly of the second housing portion to the first housing portion;

FIG. 3E is an exploded perspective view of the optical connector assembly of FIG. 3A;

FIG. 3F is a cutaway side view of the optical connector assembly of FIG. 3A and a mating connector assembly;

FIG. 8E is a schematic cross-sectional view of another optical connector assembly having a different middle support in a first position;

FIG. 9A is a schematic top perspective view of a portion of optical connector assembly having first and second housing portions with the second housing portion in a first position;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, optical connector assemblies are provided which include first and second housing portions where an optical fiber array (e.g., optical fibers from a ribbon cable) attached to an optical ferrule and a collet can be inserted in the first housing portion without substantially bending the fiber array or with limited bending of the fiber array so that the fiber array, ferrule and collet can be easily positioned within the first housing portion. Then, when the second housing portion is assembled to the first housing portion, a middle support of the second housing portion contacts and bends the optical fiber array about the middle support such that the bend causes the optical ferrule to rotate about a front support of the first housing portion. According to some embodiments, this results in the optical ferrule in a desired position with little or substantially no optical loss due to sharp bends or stretching of the optical fibers, for example.

Figure 1A:
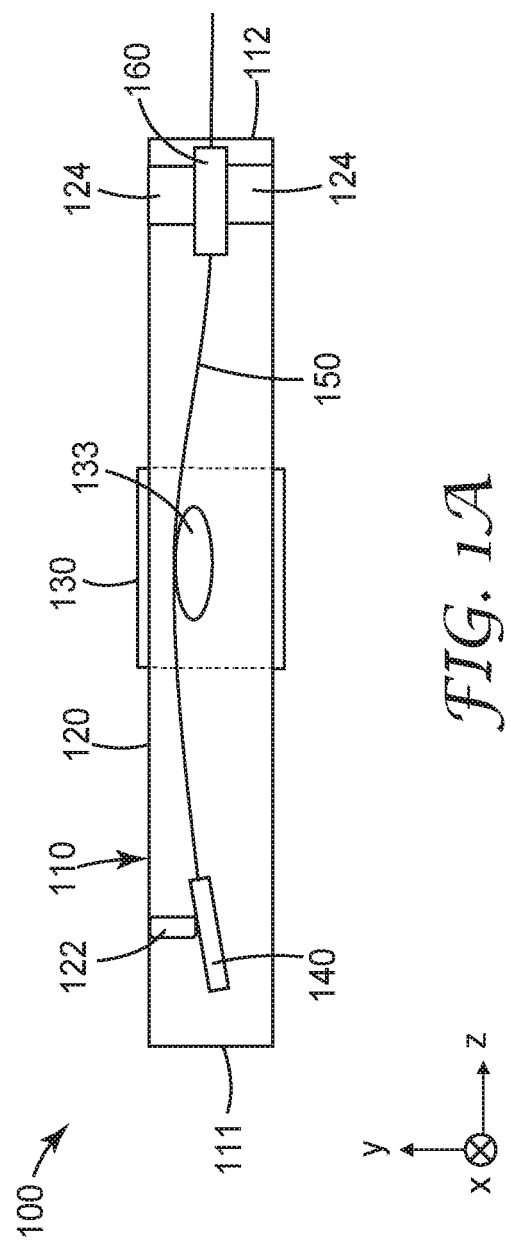
FIG. 1A is a schematic cross-sectional view of an optical connector assembly including first and second housing portions.
Figure 1C:
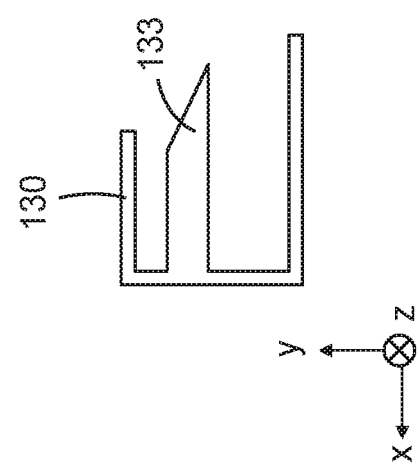
FIGS. 1C and 1D are schematic end and side views, respectively, of the second housing portion of FIG. 1A.
Figure 1D:
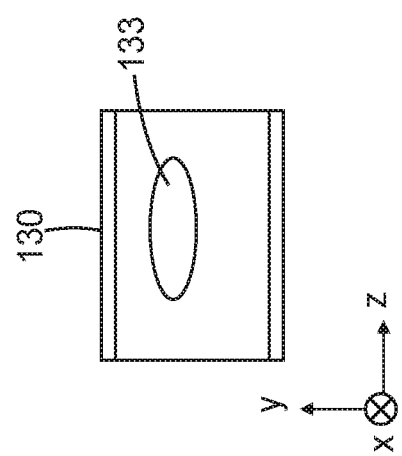

FIG. 1A is a schematic cross-sectional view of an optical connector assembly 100 including a housing 110 having a mating end 111 and an opposite cable end 112. The housing 110 includes a unitary first housing portion 120 and a unitary second housing portion 130 assembled to the first housing portion 120. FIG. 1B is a schematic cross-section view of the first housing portion 120 prior to the assembly of the second housing portion 130 to the first housing portion 120. FIGS. 1C and 1D are schematic end and side views, respectively, of the second housing portion 130. The unitary first housing portion 120 includes a front support 122 proximate the mating end 111 and a rear support 124 disposed between the front support 122 and the cable end 112. The unitary second housing portion 130 includes a middle support 133 disposed between the front and rear supports 122 and 124 of the first housing portion 120. The optical connector assembly 100 includes an optical ferrule 140 supported by the front support 122 of the first housing portion 120. As described further elsewhere herein, the optical ferrule 140 includes an attachment area for receiving a plurality of optical fibers, and a light redirecting side for changing a direction of light received from an optical fiber received in the attachment area.

In the embodiment illustrated in FIG. 1B, the front and rear supports 122 and 124 may be configured such that the ferrule 140, the fiber array 150, and the collet 160 can be placed in the first housing portion 120 without substantially bending the fiber array 150.

The optical connector assembly 100 includes a substantially flat optical fiber array 150 including a plurality of optical fibers. Front ends of the optical fibers are received by and fixedly attached (e.g., permanently attached via bonding with an optically clear adhesive) to the attachment area of the optical ferrule 140. The optical fiber array 150 is fixedly attached to the rear support 124 (e.g., by being bonded to a collet that is mechanically fixed in the rear support 124) of the first housing portion 120. When the second housing portion 130 is assembled to the first housing portion 120, the middle support 133 of the second housing portion 130 contacts and bends the optical fiber array 150 about the middle support 133. The bend causes the optical ferrule 140 to rotate about the front support 122 of the first housing portion 120. The optical fiber array 150 may be described as substantially flat if it is flat or substantially flat along the x-direction referring to the illustrated x-y-z coordinate system. It will be understood that the fiber array 150 can bend and curve along its length and be considered to be substantially flat if there is little or no bending along the x-direction. For example, ribbon cables are typically substantially flat. In some embodiments, a radius of curvature of the optical fiber array 150 in the x-y plane is at least 10, 20, 50, or 100 times a width of the fiber array 150.

Figure 1E:
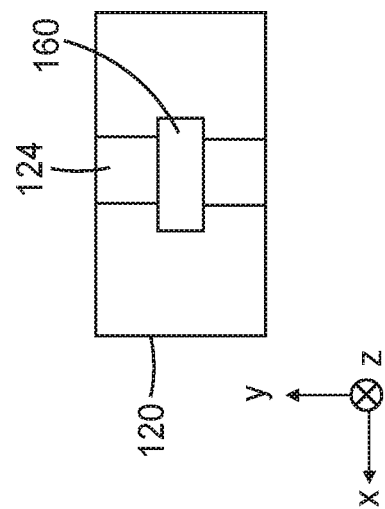
FIG. 1E is a schematic end view of the optical connector assembly of FIG. 1A.

In the illustrated embodiment, the optical fiber array 150 is fixedly attached to a collet 160 which is fixedly attached to the rear support 124 of the first housing portion 120. In some embodiments, the optical fibers entering the cable assembly are provided in a round or oval cable and the collet 160 arranges the optical fibers into the fiber array 150. In some embodiments, the optical fibers entering the cable assembly are provided in a ribbon cable. FIG. 1E is a schematic end view of the optical connector assembly 100 schematically illustrating the position of the collet 160 in the first housing portion 120. In some embodiments, the collet 160 is substantially centered in the first housing portion 120 along a first direction (one of the x- and y-directions) orthogonal to a mating direction (z-direction) of the optical connector assembly 100 (e.g., the collet 160 may be centered along the first direction to within 20 percent, or within 10%, or within 5% of a width of the first housing portion along the first direction). In some such embodiments or in other embodiments, the collet 160 is substantially centered in the first housing portion 120 along a second direction (the other of the x- and y-directions) orthogonal to the mating and first directions. In some embodiments, the collet 160 is substantially parallel to the mating direction. Having the collet 160 substantially centered along at least one transverse direction and substantially parallel to the mating direction allows the fibers to float in a cable jacket (see, e.g., cable jacket 374 depicted in FIG. 3A) and reduces optical loss due to fiber stretching or bending, for example.

The geometry of the mating end 111 of the housing 110 can be chosen such that the housing can be removably inserted into any suitable adaptor or receptacle. For example, in some embodiments, the mating end 111 of the housing 110 is configured to be removably inserted into a multi-fiber push on (MPO) adaptor, or a fiber-optic connector (FC) adaptor, or a snap-in connector (SC) adaptor, or an optical backplane adaptor (e.g., a Molex Inc. (Lisle, IL) HBMT High-density optical Backplane Mechanical Transfer (HBMT) type adaptor). As another example, in some embodiments, the mating end 111 of the housing 110 is configured to be removably inserted into an MXC receptacle.

Figure 1F:
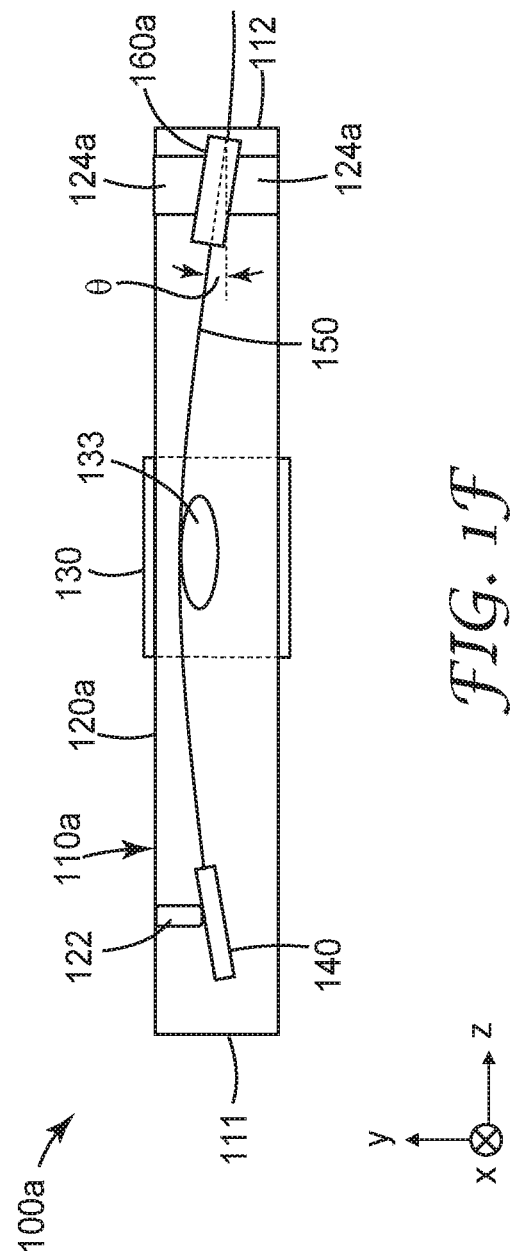
FIGS. 1F-1H are schematic cross-sectional views of other optical connector assemblies.

In some embodiments, the collet 160 retains portions of the optical fibers (e.g., the portions of the optical fibers of fiber array 150 that are in the collet 160) in the collet 160 such that the retained portions extend in a direction parallel or substantially parallel (e.g., within 15 degrees, or within 10 degrees, or within 5 degrees, or within 3 degrees) to a mating direction (z-direction) of the optical connector assembly 100. For example, in some embodiments, the collet 160 retains portions of the optical fibers in the collet 160 such that the retained portions extend in a direction making an angle with a mating direction of the optical connector assembly 100 of less than 15 degrees, or less than 10 degrees, or less than 5 degrees, or less than 3 degrees. This may be preferred in some embodiments so that the ferrule 140, optical fiber array 150 and collet 160 can be inserted in the first housing portion 120 without bending the optical fiber array 150 prior to the assembly of the second housing portion 130. In other embodiments, the collet 160 may be tilted relative to the mating direction. FIG. 1F is a schematic cross-sectional view of an optical connector assembly 100a that corresponds to optical connector assembly 100 except that the rear support 124a of the first housing portion 120a of the housing 110a positions the collet 160a at an angle relative to the mating direction (z-direction). This can be done to reduce bending loss in the fiber array 150 near the collet 160a on a front side (side facing the mating end 111) of the connector assembly. When the collet 160a is tilted there may be additional optical losses due to stretching on the cable end 112 side of the collet 160. This loss can be mitigated by including additional feature(s) proximate the collet 160 on the cable end 112 side of the collet 160 to in to prevent sharp bends in the fiber array 150 proximate the collet 160. However, in some cases, it may be desired to limit the tilt (e.g., to less than 30 degrees). In some embodiments, the collet retains portions of the optical fibers in the collet such that the retained portions extend in a direction making an oblique angle θ with a mating direction of the optical connector assembly. In some embodiments, the oblique angle θ is less than 30 degrees, or less than 25 degrees, or less than 20 degrees, or less than 15 degrees, or less than 10 degrees. In some embodiments, the collet 160a is substantially centered along the x- and y-directions. In some embodiments, the fiber array 150 is curved prior to the assembly of the second housing portion 130 to the first housing portion 120a and when the second housing portion 130 is assembled to the first housing portion 120a, the middle support 133 of the second housing portion 130 contacts and bends the optical fiber array 150 about the middle support 133 further curving the optical fiber array 150 and causing the optical ferrule 140 to rotate about the front support 122 of the first housing portion 120a.

Figure 1G:
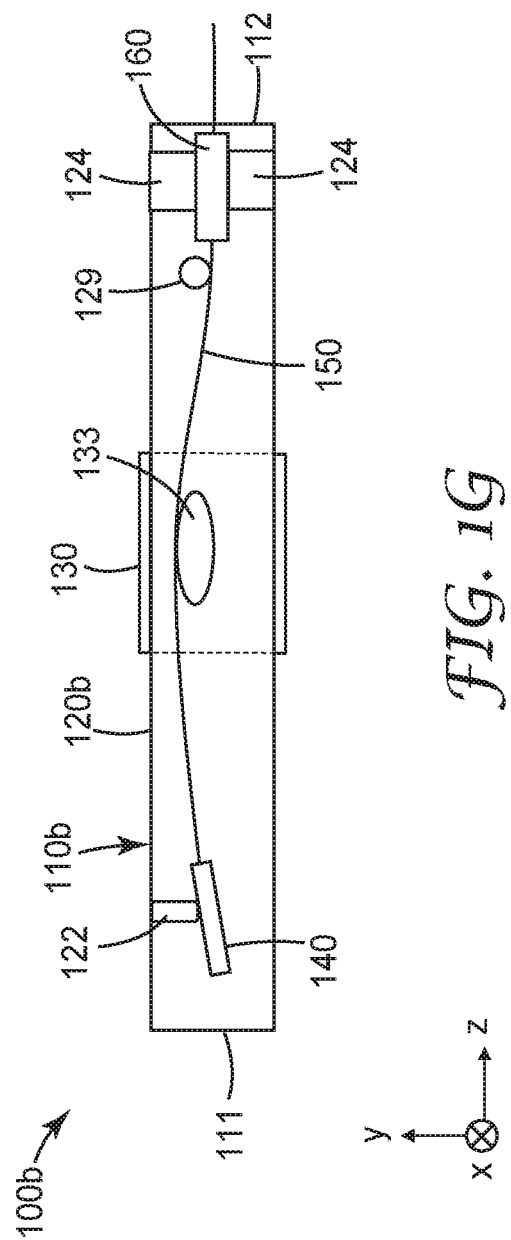

FIG. 1G is a schematic cross-sectional view of an optical connector assembly 100b that corresponds to optical connector assembly 100 except that the first housing portion 120b of the housing 110b includes a feature 129 adapted to increase a bending radius of the fiber array 150 proximate the collet 160 compared to the bending radius without the additional feature 129. The additional feature 129 may be included to reduce bending loss in the fiber array 150. In some such embodiments, the fiber array 150 is straight or substantially straight prior to the assembly of the second housing portion 130 to the first housing portion 120b and when the second housing portion 130 is assembled to the first housing portion 120b, the middle support 133 of the second housing portion 130 contacts and bends the optical fiber array 150 about the middle support 133 and also about the feature 129. In some embodiments, the additional feature 129 is a portion of the rear support holding the collet in place. For example, rear support 324 depicted in FIG. 3A, for example, can be described, in some embodiments, as including an additional feature (upper front portion 329) adapted to increase a bending radius of the fiber array 150. The bending of the fiber array 150 about the middle support 133 causes the optical ferrule 140 to rotate about the front support 122 of the first housing portion 120b. In some embodiments, an optical connector assembly includes the additional feature 129 with a tilted collet 160a to further reduce optical loss associated with fiber bending.

Figure 1H:
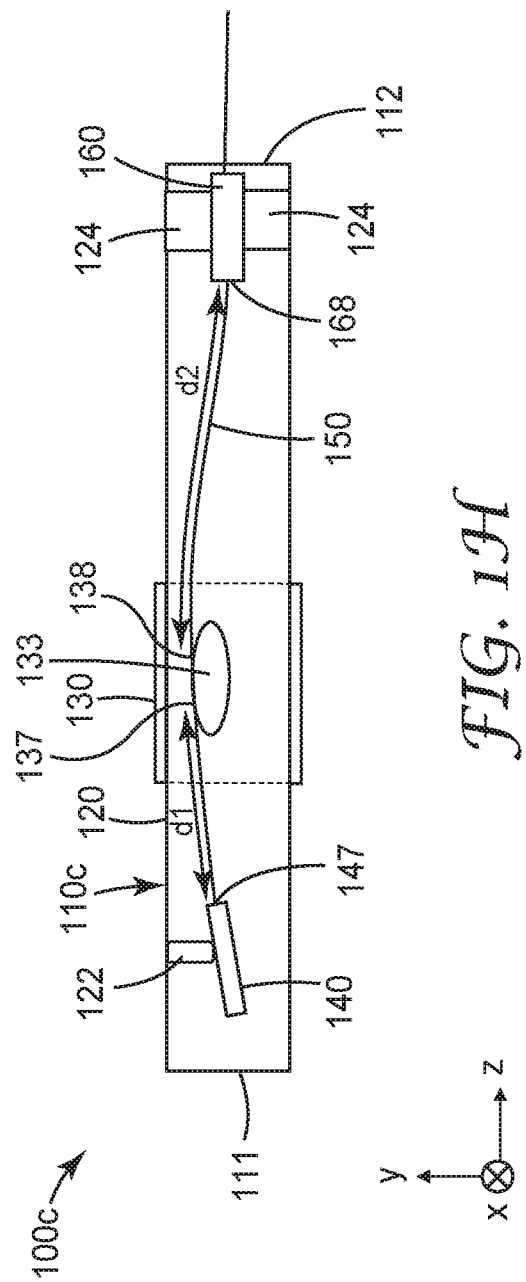

FIG. 1H is a schematic illustration of an optical connector assembly 100c which corresponds to optical connector assembly 100 except that the second housing portion 130 is closer to the mating end 111 of the housing 110c for connector assembly 100c than schematically illustrated for connector assembly 100. Having the second housing portion 130 closer to the mating end provides more resistance to deflection of the ferrule 140 during mating and reduces bending in the fiber array 150 near the collet 160. In some embodiments, the optical fibers have a length d1 between the optical ferrule 140 and the middle support 133 (e.g., shortest arc length between a point 147 where the optical fiber array 150 contacts the ferrule 140 and a point 137 on middle support 133 where the optical fiber array 150 contacts the middle support 133) and a length d2 between the middle support 133 and the collet 160 (e.g., shortest arc length between a point 138 on middle support 133 where the optical fiber array 150 contacts the middle support 133 and a point 168 where the optical fiber array 150 contacts the collet 160), where d1<d2. In some embodiments, d1<0.8 d2, or d1<0.7 d2, or d1<0.6 d2, or d1<0.5 d2. The collet 160 may hold the optical fibers substantially parallel to the mating direction as illustrated or the collet 160 may be tilted as described further elsewhere herein. Additional feature(s) may be included to reduce any bending losses as described further elsewhere herein.

In some embodiments, the optical connector assembly includes a plurality of optical ferrules and optical fiber arrays. For example, in some embodiments, the optical connector assembly further includes a second substantially flat optical fiber array including a plurality of optical fibers; and a second optical ferrule disposed in the housing proximate the mating end. The second optical ferrule includes an attachment area for receiving a plurality of optical fibers, front ends of the optical fibers of the second optical fiber array received by and fixedly attached to the attachment area of the second optical ferrule; and a light redirecting side for changing a direction of light received from an optical fiber received in the attachment area of the second optical ferrule. In some such embodiments, the unitary first housing portion further includes a second front support proximate the mating end and a second rear support disposed between the second front support and the cable end, the second optical fiber array fixedly attached to the second rear support of the first housing portion, the unitary second housing portion further including a second middle support disposed between the second front and second rear supports of the first housing portion, such that when the second housing portion is assembled to the first housing portion, the second middle support of the second housing portion contacts and bends the second optical fiber array about the second middle support, the bend in the second optical fiber array causing the second optical ferrule to rotate about the second front support of the first housing portion. In some embodiments, third, fourth, fifth, etc. optical ferrules and optical fiber arrays are also be included. An optical connector assembly including two optical ferrules and two optical fiber arrays is schematically illustrated in FIGS. 2A-2D.

Figure 2A:
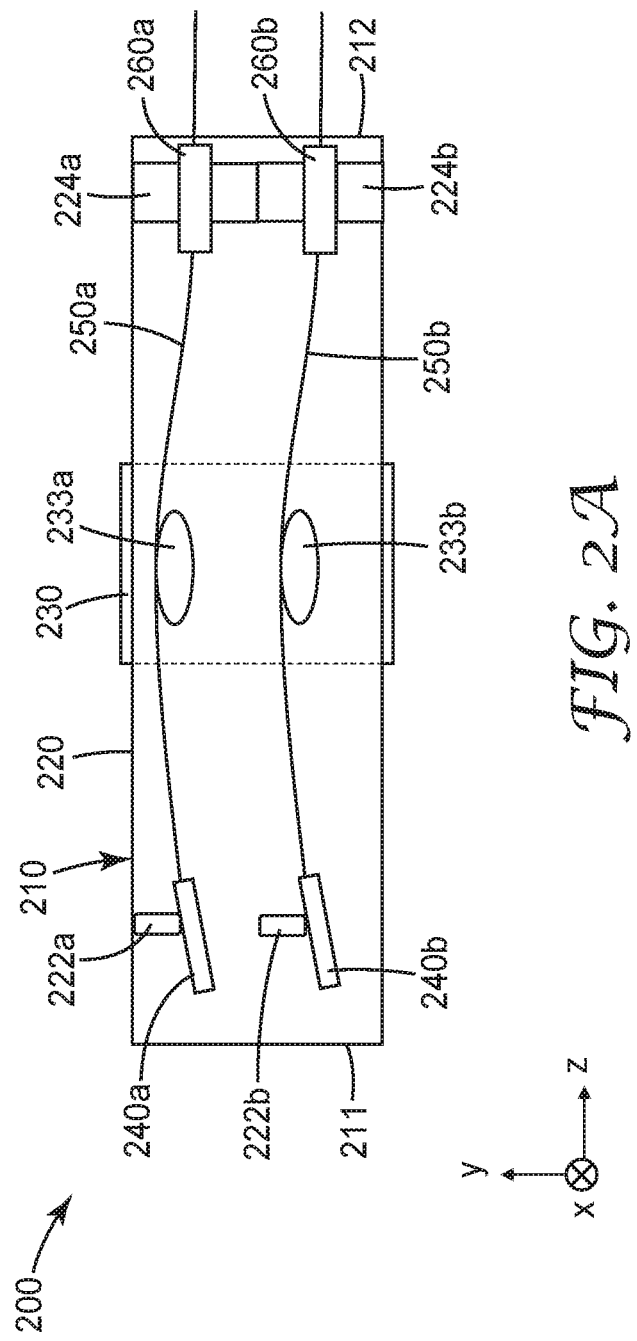
FIG. 2A is a schematic cross-sectional view of an optical connector assembly including first and second housing portions and including two optical ferrules.
Figure 2B:
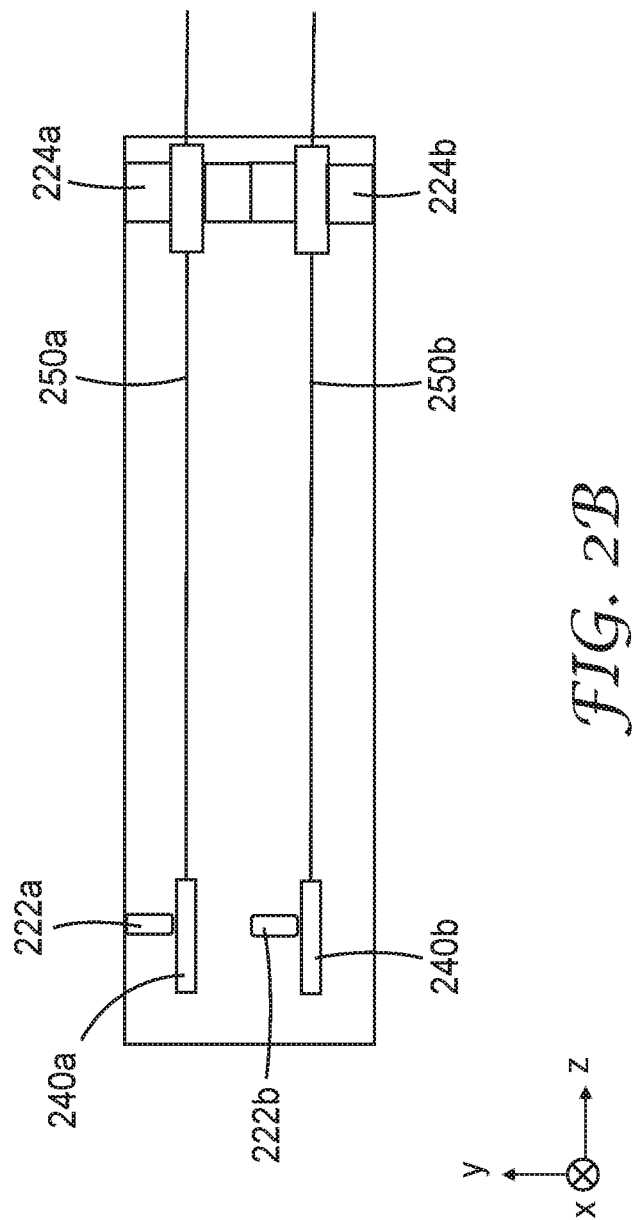
FIG. 2B is a schematic cross-sectional view of the first housing portion of FIG. 2A prior to the assembly of the second housing portion to the first housing portion.
Figure 2D:
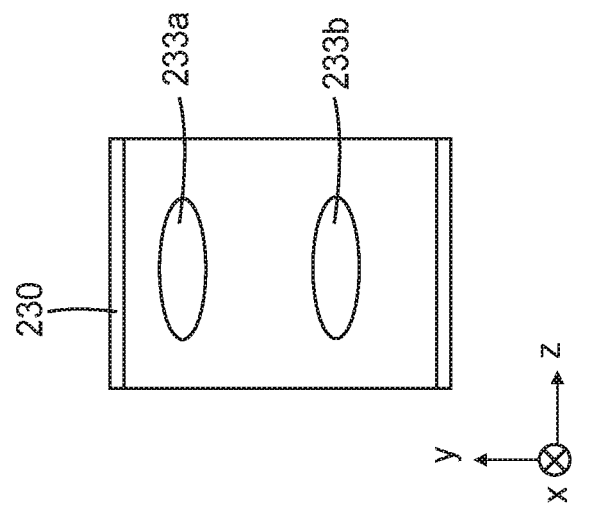
FIGS. 2C and 2D are schematic end and side views, respectively, of the second housing portion of FIG. 2A.
Figure 2C:
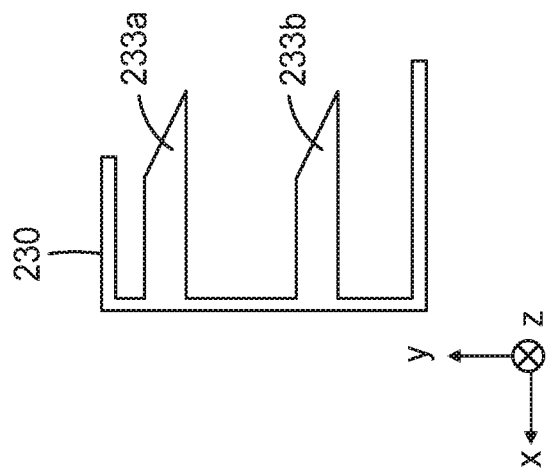

FIG. 2A is a schematic cross-sectional view of an optical connector assembly 200 including a housing 210 having a mating end 211 and an opposite cable end 212. The housing 210 includes a unitary first housing portion 220 and a unitary second housing portion 230 assembled to the first housing portion 220. FIG. 2B is a schematic cross-section view of the first housing portion 220 prior to the assembly of the second housing portion 230 to the first housing portion 220. FIGS. 2C and 2D are schematic end and side views, respectively, of the second housing portion 230. The unitary first housing portion 220 includes first and second front supports 222a and 222b proximate the mating end 211 and respective first and second rear supports 224a and 224b disposed between the respective front supports 222a and 222b and the cable end 212. The unitary second housing portion 230 includes first and second middle supports 233a and 233b disposed between the respective front 222a and 222b and rear 224a and 224b supports of the first housing portion 220. The optical connector assembly 200 includes first and second optical ferrules 240a and 240b supported by the respective front supports 222a and 222b of the first housing portion 220. As described further elsewhere herein, the first and second optical ferrules 240a and 240b each include an attachment area for receiving a plurality of optical fibers, and a light redirecting side for changing a direction of light received from an optical fiber received in the attachment area.

The optical connector assembly 200 includes first and second substantially flat optical fiber arrays 250a and 250b, each including a plurality of optical fibers. Front ends of the optical fibers are received by and fixedly attached to the attachment area of the respective optical ferrule 240a and 240b. The optical fiber array 250a (resp., 250b) is fixedly attached to the rear support 224a (resp., 224b) of the first housing portion 220. When the second housing portion 230 is assembled to the first housing portion 220, the middle support 233a (resp., 233b) of the second housing portion 230 contacts and bends the optical fiber array 250a (resp., 250b) about the middle support 233a (resp. 233b). The bend causes the optical ferrule 240a (resp., 240b) to rotate about the front support 222a (resp., 222b) of the first housing portion 220.

In the illustrated embodiment, the optical fiber arrays 250a and 250b are attached to respective collets 260a and 260b which are attached to the respective rear supports 224a and 224b of the first housing portion 220. In some embodiments, the collets 260a and 260b are substantially centered in the first housing portion 220 along a first direction (x-direction) orthogonal to a mating direction (z-direction) of the optical connector assembly 200. The collets 260a and 260b may optionally be tilted and/or additional features (e.g., 129) may be included to reduce bending of the optical fiber arrays near the collets as described further elsewhere herein. The middle supports 233a and 233b may be disposed closer to the respective ferrules 240a and 240b as described further elsewhere herein (e.g., the relative values of d1 and d2 may be as described elsewhere herein).

Figure 3A:
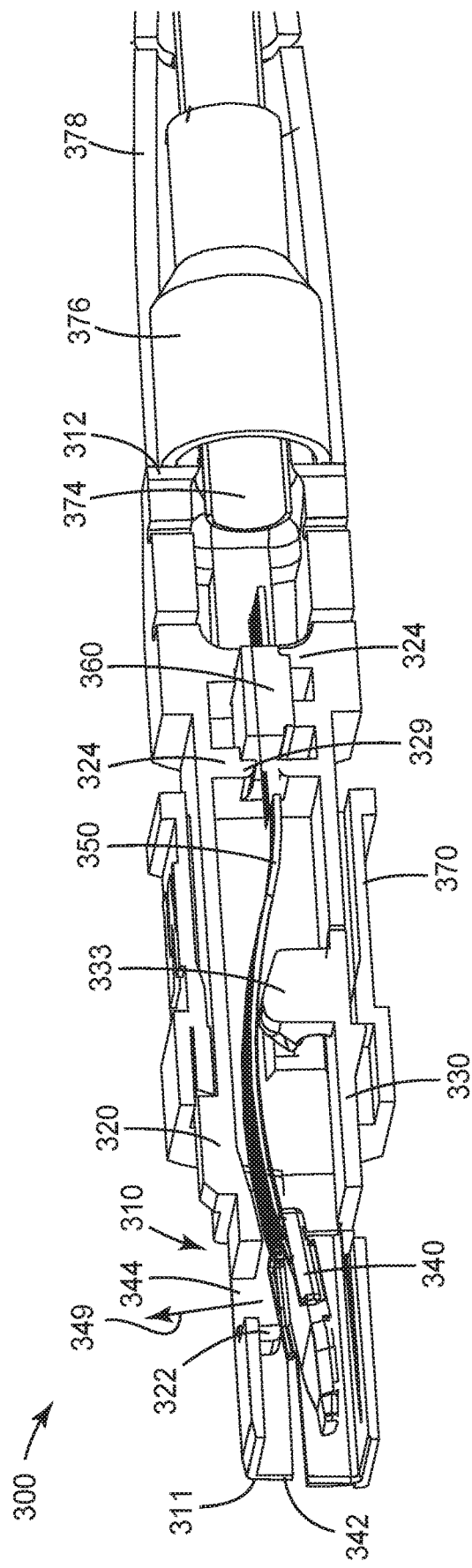
FIG. 3A is a cutaway side perspective view of an optical connector assembly.
Figure 3B:
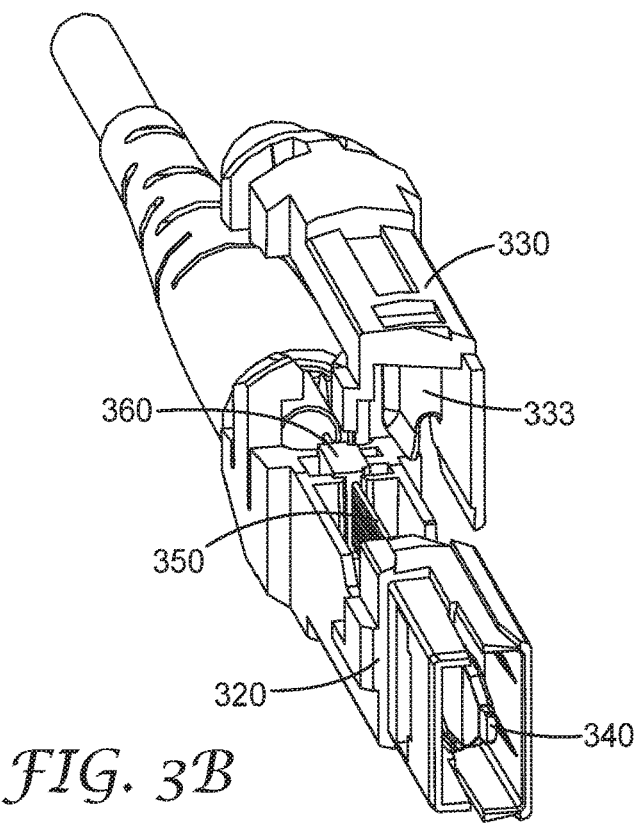
FIG. 3B is a cutaway side perspective view of the optical connector assembly of FIG. 3A with a second housing portion separated from a first housing portion.
Figure 3C:
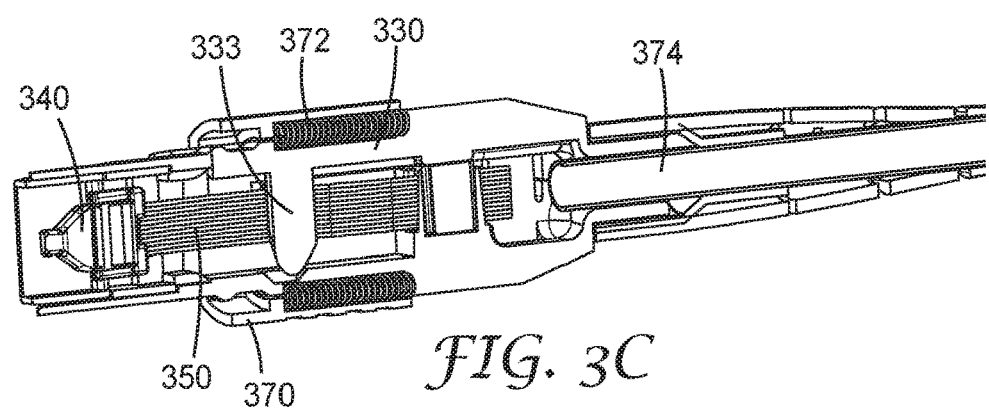
FIG. 3C is a cutaway bottom perspective view of the optical connector assembly of FIG. 3A.
Figure 3D:
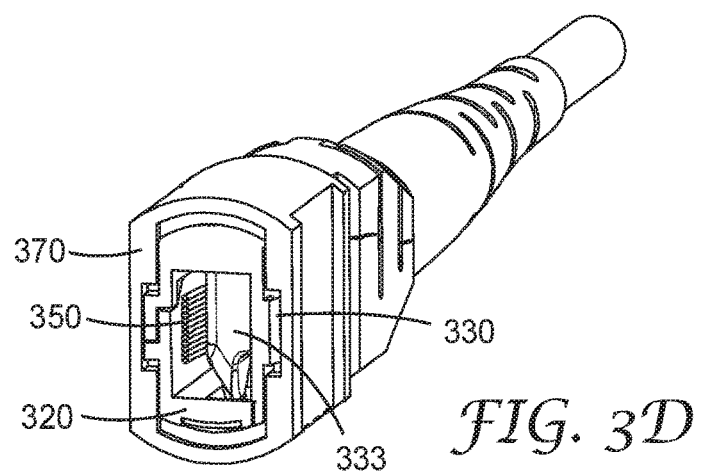
FIG. 3D is a cutaway end perspective view of the optical connector assembly of FIG. 3A.

A connector assembly 300 is schematically illustrated in FIGS. 3A-3F. FIG. 3A is a cutaway side perspective view of the connector assembly 300 which may generally correspond to connector assembly 100. Elements 310, 311, 312, 320, 322, 324, 330, 330, 350, and 360 correspond to elements 110, 111, 112, 120, 122, 124, 130, 130, 150, and 160. In the illustrated embodiment, the mating end 311 of the housing 310 is configured to be removably inserted into a multi-fiber push on (MPO) adaptor 380 (see FIG. 3F). FIG. 3B is a cutaway side perspective view of the optical connector assembly 300 with the unitary second housing portion 330 separated from the unitary first housing portion 320. In some embodiments, when the second housing portion 330 is assembled to the first housing portion 320, the middle support 333 of the second housing portion 330 contacts and bends the optical fiber array 350 about the middle support 333, where the bend causes the optical ferrule 340 to rotate about the front support 322 of the first housing portion 320. FIG. 3C is a cutaway bottom perspective view of the optical connector assembly 300. FIG. 3D is a cutaway end perspective view of the optical connector assembly 300. FIG. 3E is an exploded perspective view of the optical connector assembly 300. FIG. 3F is a cutaway side view of the optical connector assembly 300 and a mating connector assembly 300' inserted into a multi-fiber push on (MPO) adaptor 380. In the illustrated embodiment, the mating connector assembly 300' includes a middle support 333' corresponding to middle support 333, a mating optical ferrule 340' corresponding to optical ferrule 340, and a fiber array 350' corresponding to fiber array 350. In some embodiments, the connector assembly 300 is hermaphroditic. For example, in some embodiments, the connector assembly 300 and the connector assembly 300' have a substantially same size and shape. In some embodiments, the optical ferrule 340 is hermaphroditic. Other connector assemblies and/or optical ferrules described herein may be hermaphroditic.

The connector assembly 300 also includes a cover 370 which may aid in the initial alignment of the ferrule 340 and a mating ferrule and which can slide relative to the housing 310 when inserted into an adapter 380. In some embodiments, springs 372 are provided which provide resistance to sliding of the cover 370. The connector assembly further includes a cable jacket 374, a boot 378, and a clamp 376 assembling the cable jacket 374 and the boot 378 to the housing 310. The portion of the optical fibers extending into the cable jacket 374 is not illustrated.

In some embodiments, the first housing portion 320 further includes a first opening 342 for receiving a mating optical ferrule 340' and a different second opening 344 facing a light output surface of the optical ferrule 340. In some embodiments, the optical connector assembly 300 is configured such that a central light ray 349 emitted by an optical fiber received in the attachment area and redirected by the light redirecting side exits the optical connector assembly 300 through the second opening 344 when the optical connector assembly 300 is not mated with a mating optical connector assembly 300'. In some embodiments, the second opening 344 is included to facilitate testing, inspection, and/or cleaning of the optical ferrule 340.

Figure 4A:
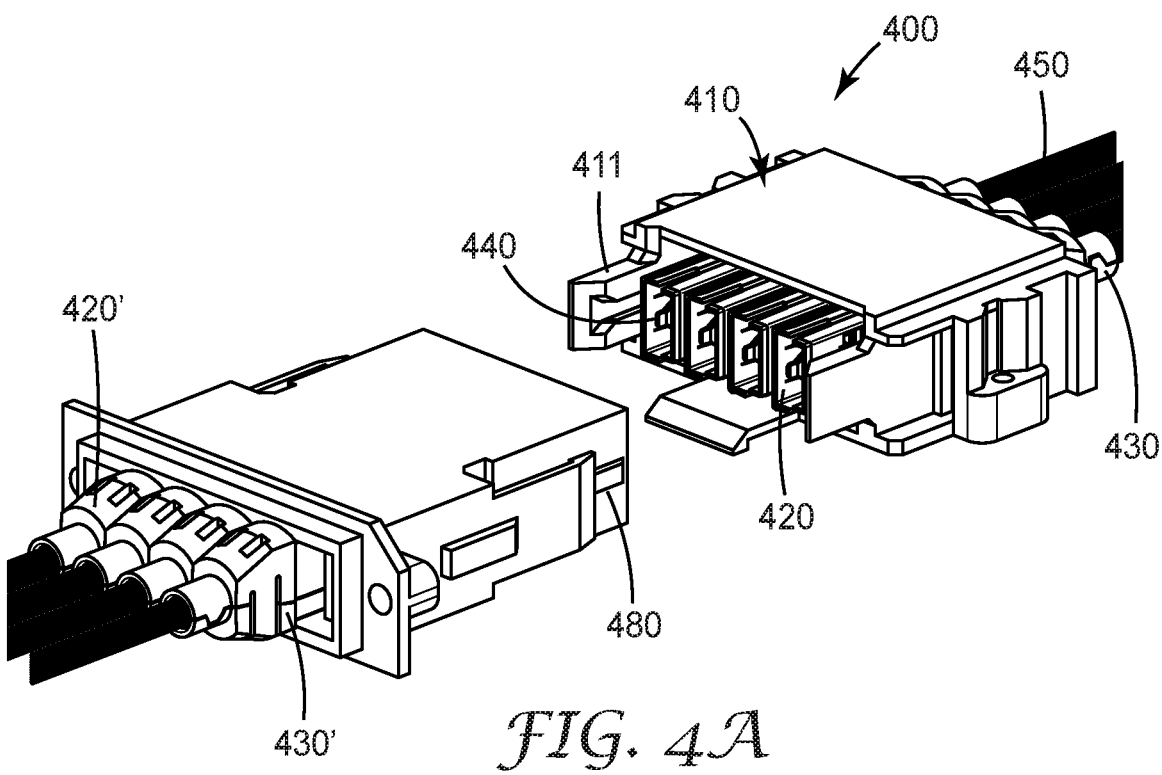
FIGS. 4A-4B are front and rear perspective views of an optical connector assembly disposed proximate an optical backplane adaptor.
Figure 4B:
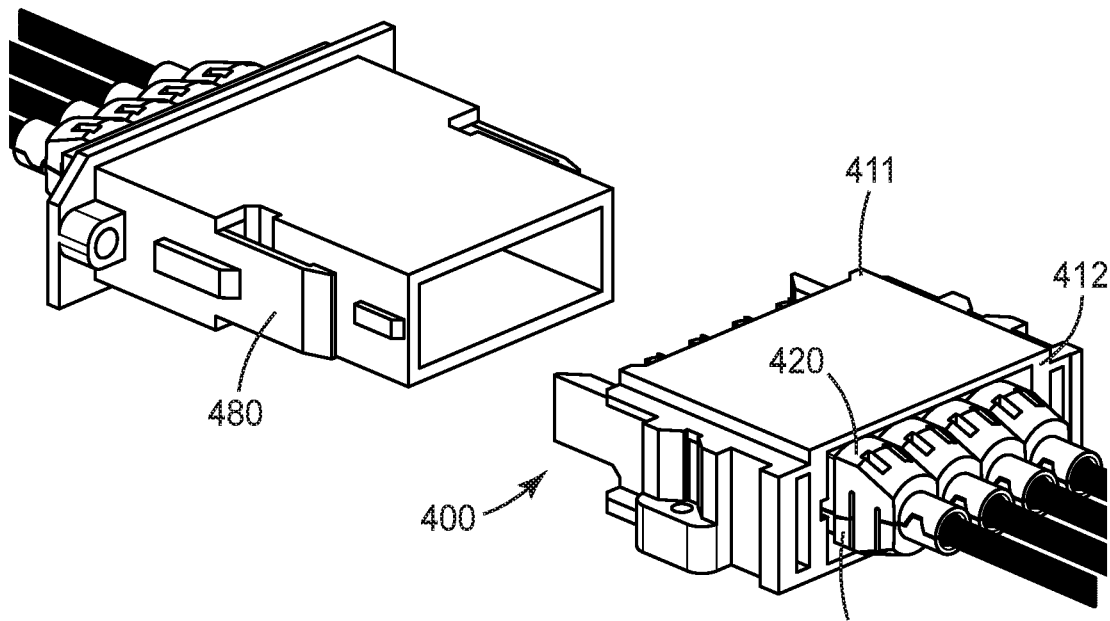

In some embodiments, as illustrated in FIGS. 4A-4B, the housing includes a plurality of unitary first housing portions and a corresponding plurality of second housing portions, where each second housing portion is assembled to a corresponding first housing portion and includes a middle support.

FIGS. 4A-4B are front and rear perspective views of optical connector assembly 400 disposed proximate an optical backplane adaptor 480. For example, the adaptor 480 may be a High-density optical Backplane Mechanical Transfer (HBMT) type adaptor. In some embodiments, the mating end 411 of the housing 410 is configured to be removably inserted into the optical backplane adaptor 480. The connector assembly 400 includes a housing 410 which includes a plurality of first and second housing portions 420 and 430. In the illustrated embodiment, four pairs of first and second housing portions 420 and 430 are included arranged in a row. In other embodiments, more or fewer pairs are included. In some embodiments, a plurality of rows is included. In some embodiments, each first housing portion 420 corresponds to first housing portion 120 or 320 and each second housing portion 430 corresponds to second housing portion 130 or 330. In the illustrated embodiment, the adaptor 480 includes a plurality of first and second housing portions 420' and 430' inserted therein. In some embodiments, each first housing portion 420' corresponds to first housing portion 120' or 320' and each second housing portion 430' corresponds to second housing portion 130' or 330'.

In some embodiments, an optical connector assembly 800 includes a housing 810, an optical ferrule 840, and a substantially flat optical fiber array 850. The housing 810 has a mating end 811 and an opposite cable end 812, and includes a front support 822 proximate the mating end 811; a rear support 824 disposed between the front support 822 and the cable end 812; and a middle support 833 disposed between the front and rear supports 822 and 824 and configured to move between first (FIG. 8A) and second (FIG. 8B) positions. The optical ferrule 840 is adjacent the front support 822 of the housing 810 and includes an attachment area for receiving a plurality of optical fibers; and a light redirecting side for changing a direction of light received from an optical fiber received in the attachment area. The substantially flat optical fiber array 850 includes a plurality of optical fibers. Front ends of the optical fibers are received by and fixedly attached to the attachment area of the optical ferrule and the optical fiber array 850 is fixedly attached to the rear support 824 of the housing 810, such that when the middle support 833 moves from the first position to the second position, the middle support 833 contacts and bends the optical fiber array 850 about the middle support 833. The bend causes the optical ferrule 840 to rotate about the front support 822 of the housing 810.

In some embodiments, the housing 810 includes a unitary first housing portion 820 that includes the front and rear supports 822 and 824, and a unitary second housing portion 830 that includes the middle support 833. In some embodiments, the second housing portion is not attached to the first housing portion when the middle support is in the first position and is attached to the first housing portion when the middle support is in the second position (e.g., the first position may be a position prior to assembly of the second housing portion to the first housing portion and the second position may be the position after assembly of the second housing portion to the first housing portion). In some embodiments, the second housing portion 830 is attached to the first housing portion 820. In some such embodiments, the second housing portion 830 remains attached to the first housing portion 820 while the middle support 833 is moved between the first and second positions. For example, the second housing portion 830 may be attached to the first housing portion 820 via a hinge or a rail or retaining groove(s), for example, that allows the second housing portion 830 to move relative to the first housing portion 820 while keeping the first and second housing portions 820 and 830 attached to one another. In some embodiments, the housing 810 includes a latch or other feature (e.g., provided in a cover portion) to hold the middle support 830 in the second position.

Figure 8A:
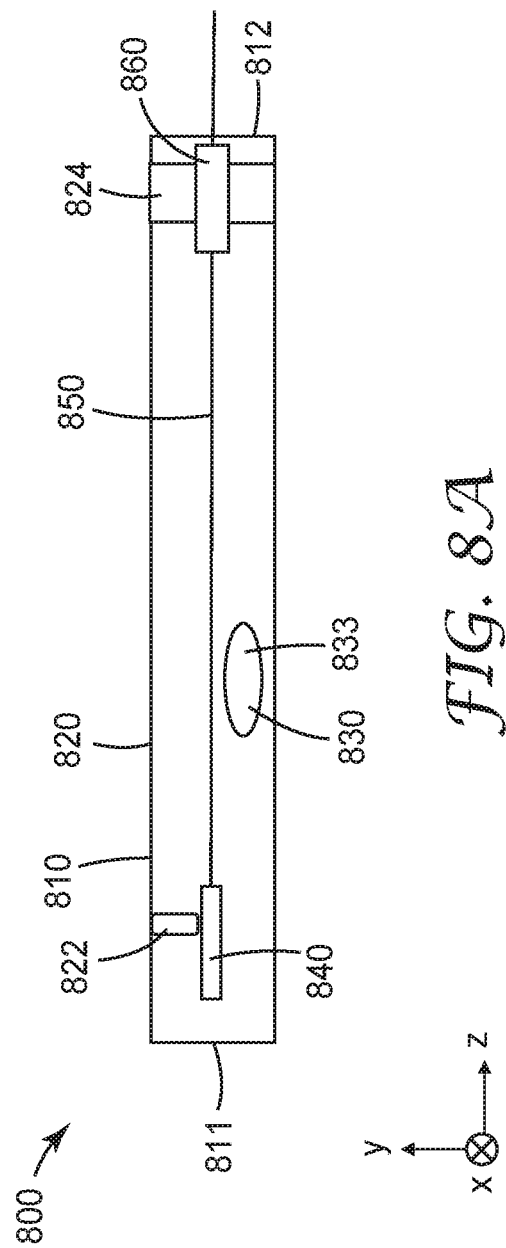
FIG. 8A is a schematic cross-sectional view of an optical connector assembly having a middle support in a first position.
Figure 8B:
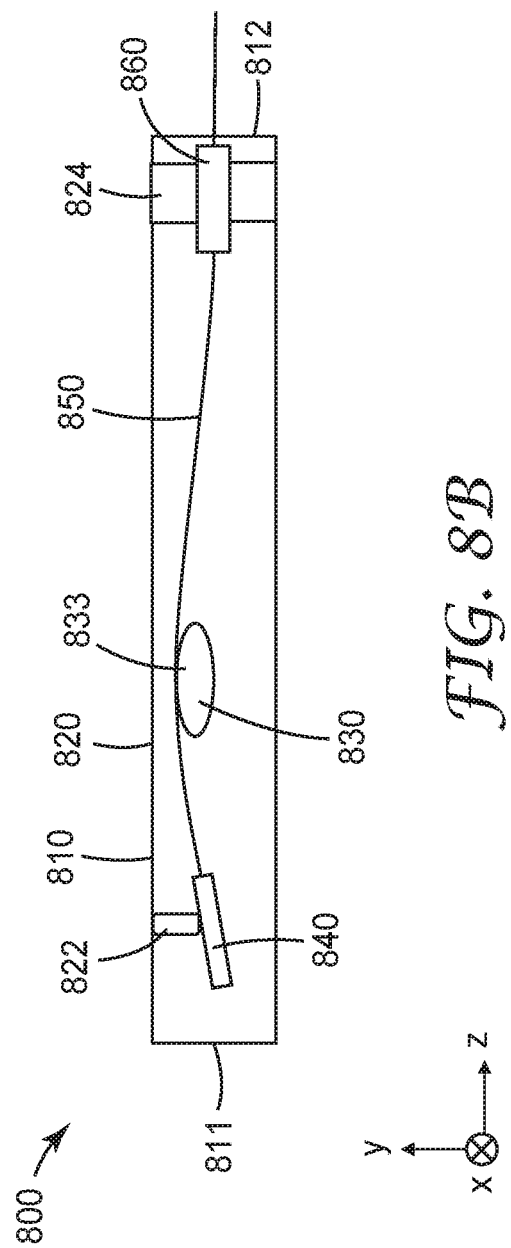
FIG. 8B is a schematic cross-sectional view of the optical connector assembly of FIG. 8A where the middle support in a second position.
Figure 8C:
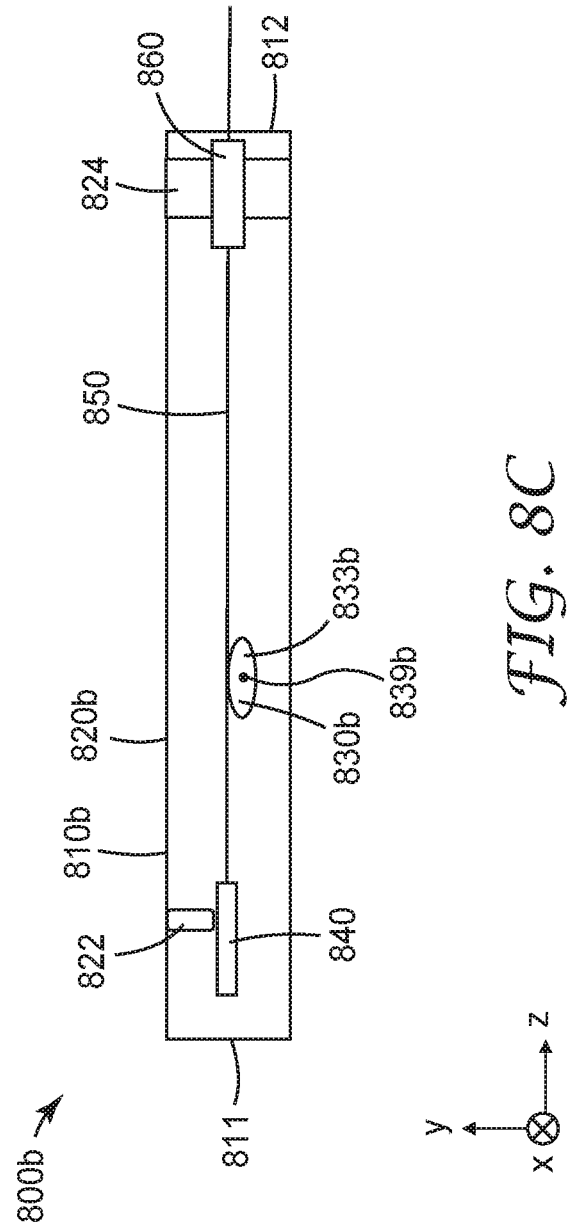
FIG. 8C is a schematic cross-sectional view of another optical connector assembly having a middle support in a first position.
Figure 8D:
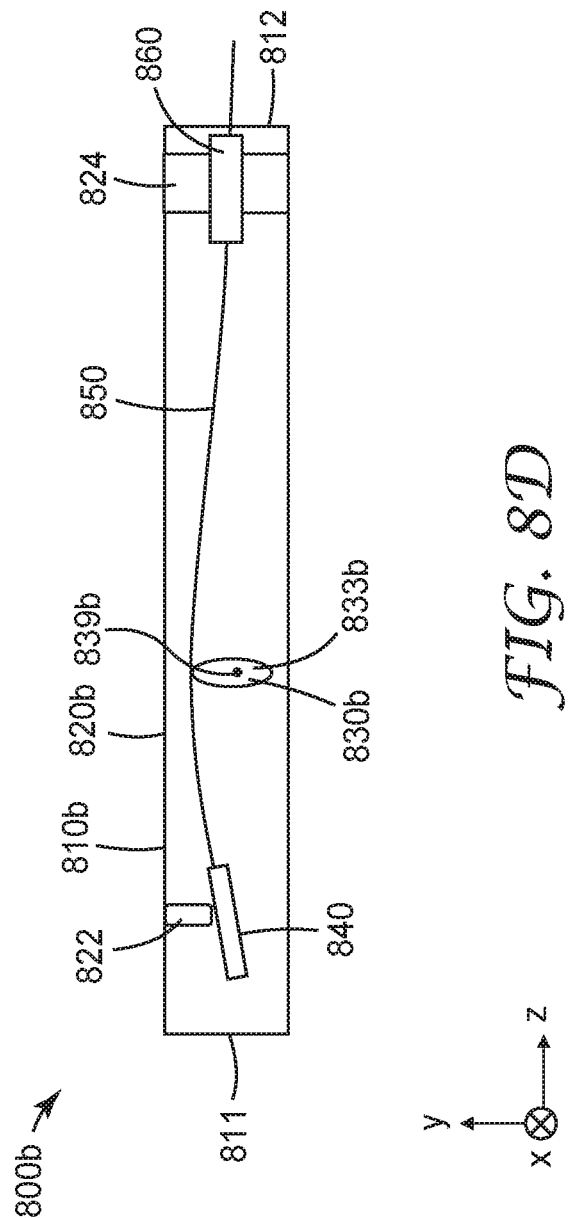
FIG. 8D is a schematic cross-sectional view of the optical connector assembly of FIG. 8C where the middle support in a second position.
Figure 8F:
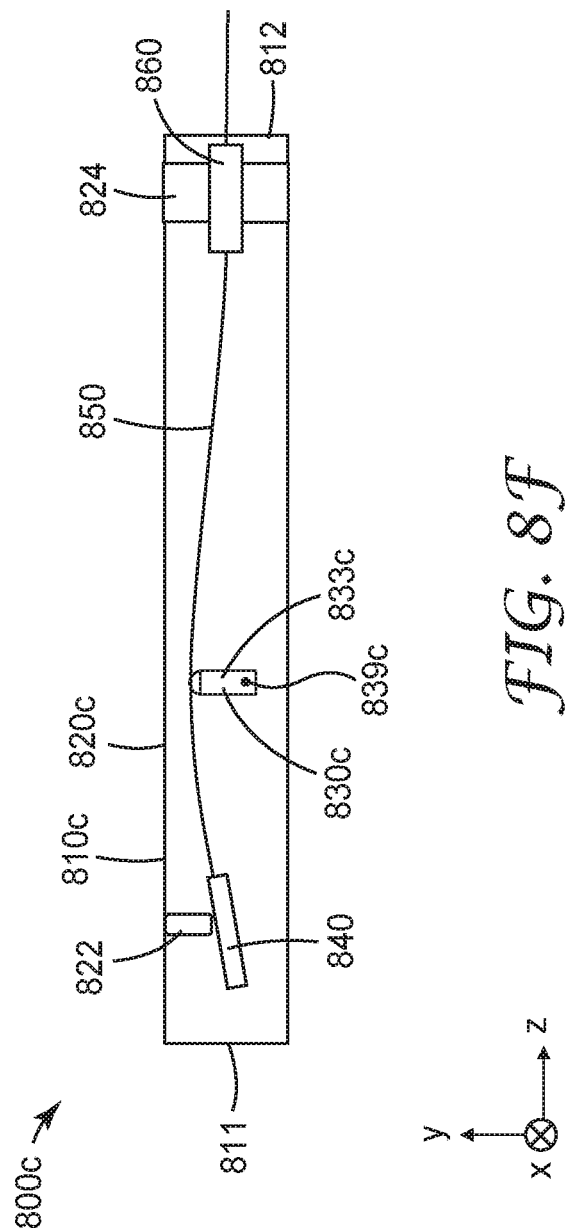
FIG. 8F is a schematic cross-sectional view of the optical connector assembly of FIG. 8E where the middle support in a second position.

Different first and second positions of a middle support may include different rotational orientations of the middle support and/or different translational positions of the middle support (e.g., different positions of a center of mass of the middle support along a direction of movement). In some embodiments, the middle support 830 is configured to move at least one of translationally (e.g., linearly) or rotationally between the first and second position. For example, the middle support 830 of the optical connector assembly 800 may move substantially linearly from the first position (FIG. 8A) to the second position (FIG. 8B). As another example, FIGS. 8C-8D schematically depict an optical connector assembly 800b corresponding to optical connector assembly 800 but having a housing 810b including a first housing portion 820b and a second housing portion 830b including middle support 830b configured to move between first (FIG. 8C) and second (FIG. 8D) positions substantially by rotation about axis 839b (e.g., an axis along a rod or axel attaching the second housing portion 830b to the first housing portion 820b). In the embodiments of FIGS. 8C-8D, the middle support 830b has a substantially oval shape. Other shapes can be used. For example, FIGS. 8E-8F schematically depict an optical connector assembly 800c corresponding to optical connector assembly 800b but having a housing 810c including a first housing portion 820c and a second housing portion 830c including middle support 830c which is configured to move between first (FIG. 8E) and second (FIG. 8F) positions by rotation about axis 839c. In the illustrated embodiment, the second housing portion 830c which has a shape substantially of a rectangle with a rounded (e.g., spherical cap) end. The axis 839c is disposed closer to the end of the second housing portion 830c opposite the rounded end. This may allow the second housing portion 830c to more easily fit in the space under the fiber array 850 of FIG. 8D when the middle support 833c is in the first position and to provide the desired displacement of the fiber array 850 when the middle support 833c is in the second position.

The optical connector assembly 800 may include features or elements of any other optical connector assemblies described elsewhere herein. For example, the optical fibers may have a length d1 between the optical ferrule 840 and the middle support 833 and a length d2 between the middle support 833 and the collet 860 when the middle support is in the second position, where d1<d2 or in any of the ranges described elsewhere herein. The collet 860 may hold the optical fibers substantially parallel to the mating direction as illustrated or may be tilted as described further elsewhere herein. Additional feature(s) may be included to reduce any bending losses as described further elsewhere herein.

Figure 9B:
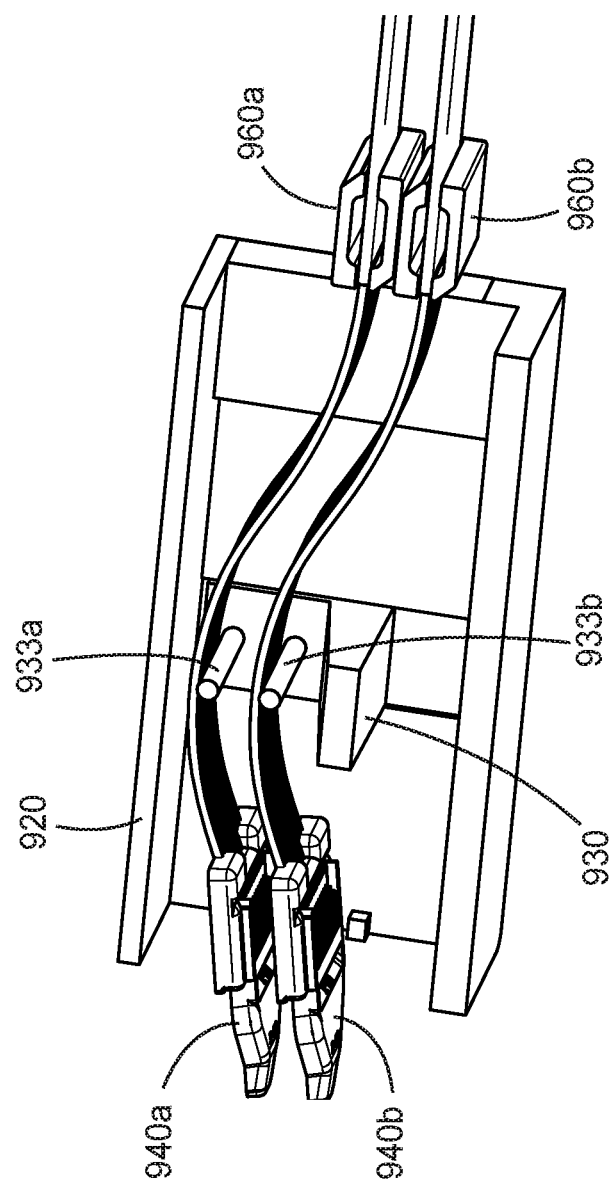
FIG. 9B is a schematic top perspective view of the portion of the optical connector assembly of FIG. 9A where the second housing portion is in a second position.
Figure 9C:
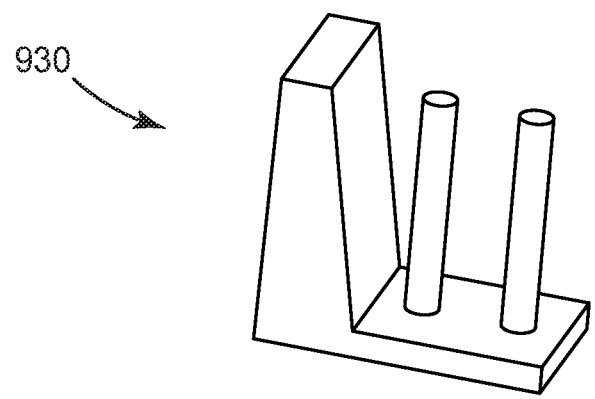
FIG. 9C is a schematic perspective view of the second housing portion of FIGS. 9A-9B.
Figure 9D:
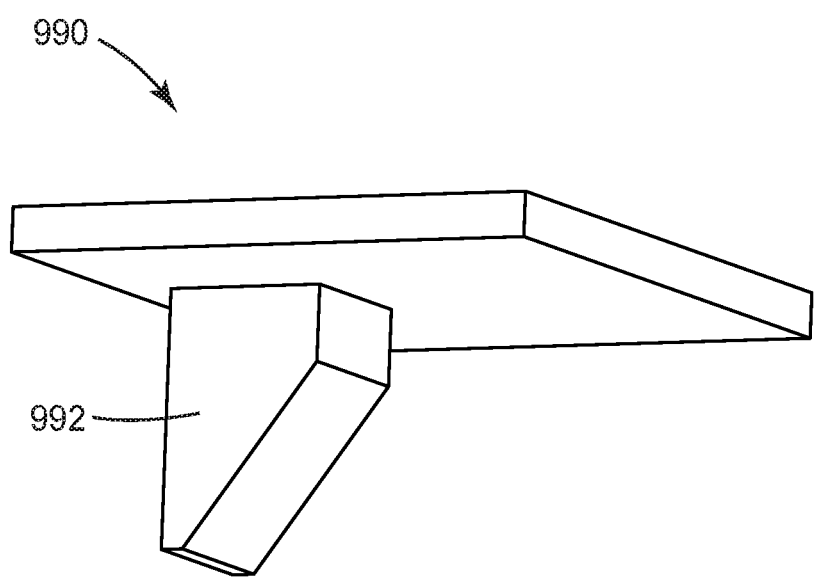
FIG. 9D is a schematic perspective view of a cover portion.
Figure 9E:
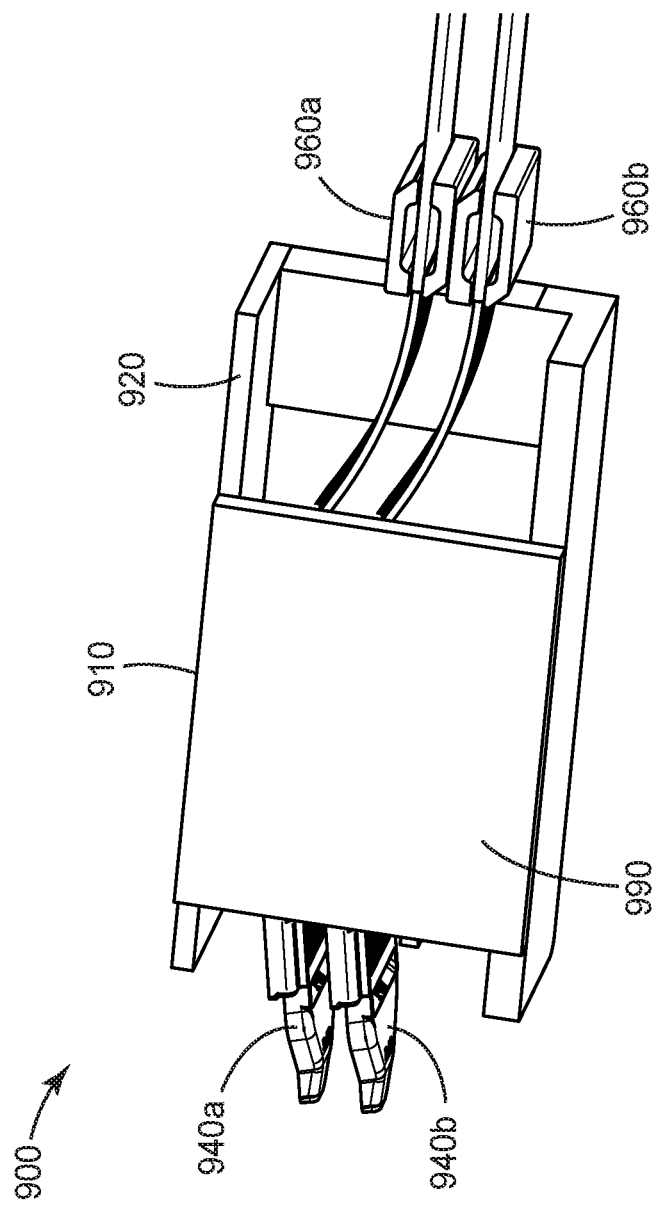
FIG. 9E is a schematic perspective view of an optical connector assembly including the cover portion of FIG. 9D assembled to the first housing portion of FIGS. 9A-9B.

FIGS. 9A-9E are schematic illustrations of portions of an optical connector assembly 900. In some embodiments, an optical connector assembly 900 includes a housing 910 (see FIG. 9E), at least one optical ferrule 940a, 940b, and at least one substantially flat optical fiber array 950a, 950b. The housing 910 has a mating end and an opposite cable end, and includes, for each optical ferrule and fiber array, a front support proximate the mating end; a rear support disposed between the front support and the cable end; and a middle support 933a, 933b disposed between the front and rear supports and configured to move between first (FIG. 9A) and second (FIG. 9B) positions. When the middle support 933a, 933b moves from the first position to the second position, the middle support 933a, 933b contacts and bends the corresponding optical fiber array 950a, 950b about the middle support 933a, 933b. The bend causes the respective optical ferrule 940a, 940b to rotate about the corresponding front support. In the illustrated embodiment, a portion of a unitary first housing portion 920 of the housing is illustrated. The first housing portion 920 may extend further towards the cable end of the housing to include a rear support for receiving the collets 960a, 960b. A unitary second housing portion 930 incudes the middle supports 933a and 933b. The unitary second housing portion 930 can be moved between a first position (FIG. 9A) and a second position (FIG. 9B). The collets 960a, 960b may remain in a fixed position (e.g., within rear supports as described elsewhere) while the second housing portion 930 is moved. FIG. 9C is a schematic perspective view of the unitary second housing portion 930. FIG. 9D is a schematic perspective view of a unitary cover portion 990. FIG. 9E is a schematic perspective view of the optical connector assembly 900 including a housing 910 that includes the first and second housing portions 920 and 930 and the cover portion 990. In some embodiments, the housing 910 includes the unitary second housing portion 930 and the unitary first housing portion 920 that includes the front and rear supports, such that when the middle support is in the first position (FIG. 9A) and the unitary cover portion 990 is assembled to the unitary first housing portion 920, the unitary cover portion 990 moves the middle support to the second position (FIG. 9B). For example, in the illustrated embodiment, the cover portion 990 includes a wedge portion 992 (that has a wedge or tapered shape) which pushes the second housing portion 930 from the position illustrated in FIG. 9A to the position illustrated in FIG. 9B when the cover portion 990 is assembled to the first housing portion 920 and this moves each middle support 933a and 933b from the first position of the middle support to the second position of the middle support. In some embodiments, the cover portion 990 fully or substantially fully covers the first housing portion 920.

The second housing portion 930 may be disposed in a groove or trench 993 in the first housing portion 920 that allows the second housing portion 930 to slide in the groove or trench 993. In some embodiments, the cover portion 990 holds the middle support 933a, 933b in the second position when the cover portion 990 is assembled to the first housing portion 920. In some embodiments, the cover portion 990 is removably assembled to the first housing portion 920 such that the middle support 933a, 933b can be returned to the respective first position by removing the cover portion 990 and then sliding the second housing portion 930 from the position illustrated in FIG. 9B to the position illustrated in FIG. 9A.

In some embodiments, the optical connector assembly 900 can alternatively be described as including a housing 910 including a unitary first housing portion 920 and a unitary second housing portion 930 assembled to the first housing portion 920 where the second housing portion 930 is assembled to the first housing portion 920 through the cover portion 990 (which may prevent the second housing portion 930 from being removed from the groove or trench 933 and which may hold the second housing portion 930 in the position illustrated in FIG. 9B) such that when the second housing portion 930 is assembled to the first housing portion 920 using the cover portion 990, the middle support 933a, 933b of the second housing portion 930 contacts and bends the respective optical fiber array 950a, 950b about the respective middle support 933a, 933b, the bend causing the respective optical ferrule 940a, 940b to rotate about the front support of the first housing portion 920.

While the embodiment schematically illustrated in FIGS. 9A-9E includes two optical ferrules and two corresponding optical fiber arrays, any number (e.g., one, or two, or more) optical ferrules and corresponding optical fiber arrays may be included. Other features described elsewhere herein (e.g., feature(s) to reduce bending loss, relative distance between ferrule and middle support and between middle support and collet (e.g., d1<d2), or tilt or lack thereof of the collet) may also be included in the optical connector assembly 900.

In some embodiments, an optical connector assembly 400 includes a housing 410 including a unitary first housing portion (any one of first housing portions 420) and a unitary second housing portion (the second housing portion in the plurality of second housing portions 430 corresponding to the first housing portion). The optical connector assembly may further include a substantially flat optical fiber array (the fiber array in the plurality of cables 450 corresponding to the first housing portion) including a plurality of optical fibers, front ends of the optical fibers received by and fixedly attached to an attachment area of an optical ferrule, the optical fiber array fixedly attached to the rear support of the first housing portion, such that when the second housing portion is assembled to the first housing portion, the middle support (e.g., corresponding to middle support 133 or 333 or 833 or 933a) of the second housing portion contacts and bends the optical fiber array about the middle support, the bend causing the optical ferrule to rotate about the front support of the first housing portion. In some embodiments, the optical connector assembly 400 further includes a second substantially flat optical fiber array (a different optical fiber array in the plurality of cables 450) including a plurality of optical fibers; and a second optical ferrule (the optical ferrule in the plurality of optical ferrules 440 receiving the second optical fiber array) disposed in the housing proximate the mating end 411, the second optical ferrule including an attachment area for receiving a plurality of optical fibers, front ends of the optical fibers of the second optical fiber array received by and fixedly attached to the attachment area of the second optical ferrule; and a light redirecting side for changing a direction of light received from an optical fiber received in the attachment area of the second optical ferrule. In some embodiments, the housing 410 further includes a unitary third housing portion (corresponding to the first housing portion in plurality of first housing portions 420 that corresponds to the second optical fiber array) including a front support (e.g., corresponding to front support 122 or 322) proximate the mating end 411 and a rear support (e.g., corresponding to rear support 124 or 324) disposed between the front support and the cable end 412, the second optical ferrule being supported by the front support of the third housing portion; and a unitary fourth housing portion (corresponding to the second housing portion in plurality of second housing portions 430 that corresponds to the second optical fiber array) assembled to the third housing portion and including a middle support (e.g., corresponding to middle support 133 or 333 or 833 or 933a) disposed between the front and rear supports of the third housing portion, such that when the fourth housing portion is assembled to the third housing portion, the middle support of the fourth housing portion contacts and bends the second optical fiber array about the middle support of the fourth housing portion, the bend causing the second optical ferrule to rotate about the front support of the third housing portion.

Figure 5A:
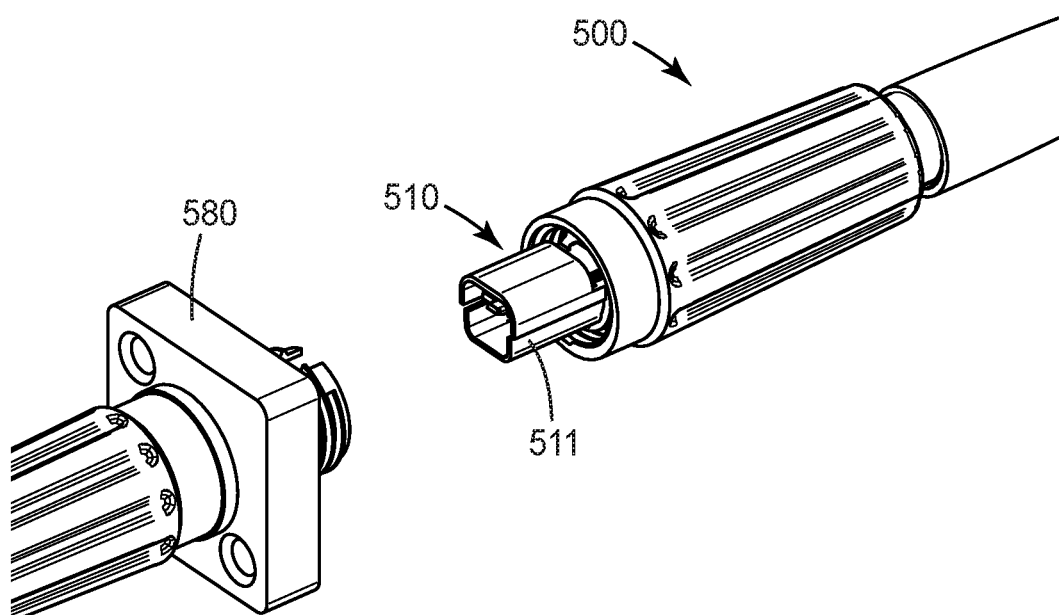
FIGS. 5A-5B are front and rear perspective views of an optical connector assembly disposed proximate a fiber-optic connector (FC) adaptor.
Figure 5B:
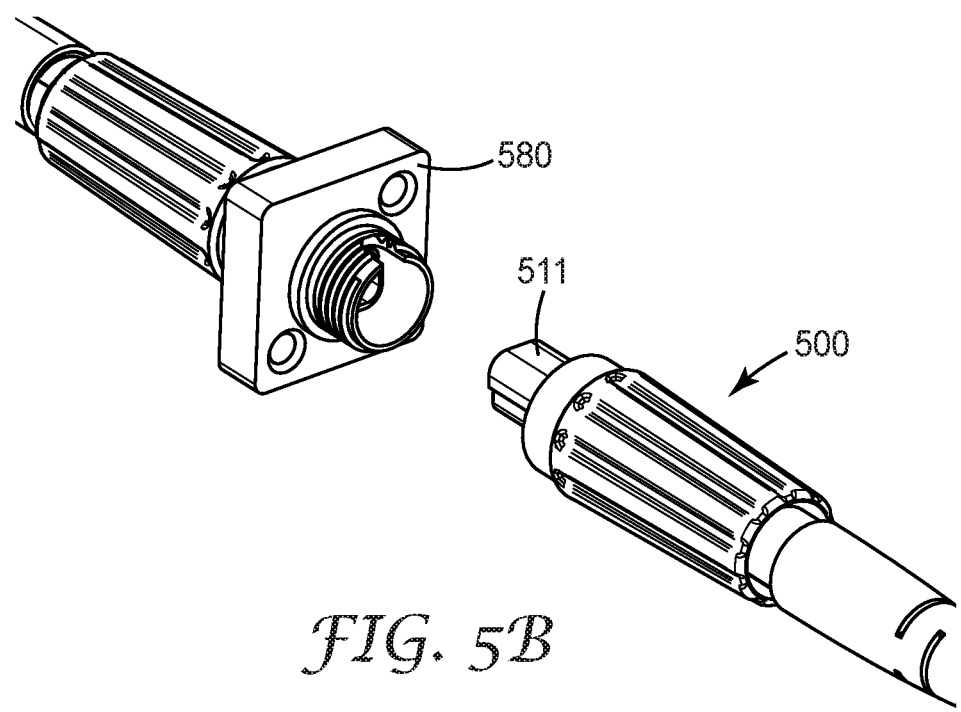

FIGS. 5A-5B are front and rear perspective view of optical connector assembly 500 disposed proximate a fiber-optic connector (FC) adaptor 580. Optical connector assembly 500 may correspond to optical connector assembly 100 or 300, for example. In some embodiments, the mating end 511 of the housing 510 of the optical connector assembly 500 is configured to be removably inserted into the fiber-optic connector (FC) adaptor 580.

Figure 6A:
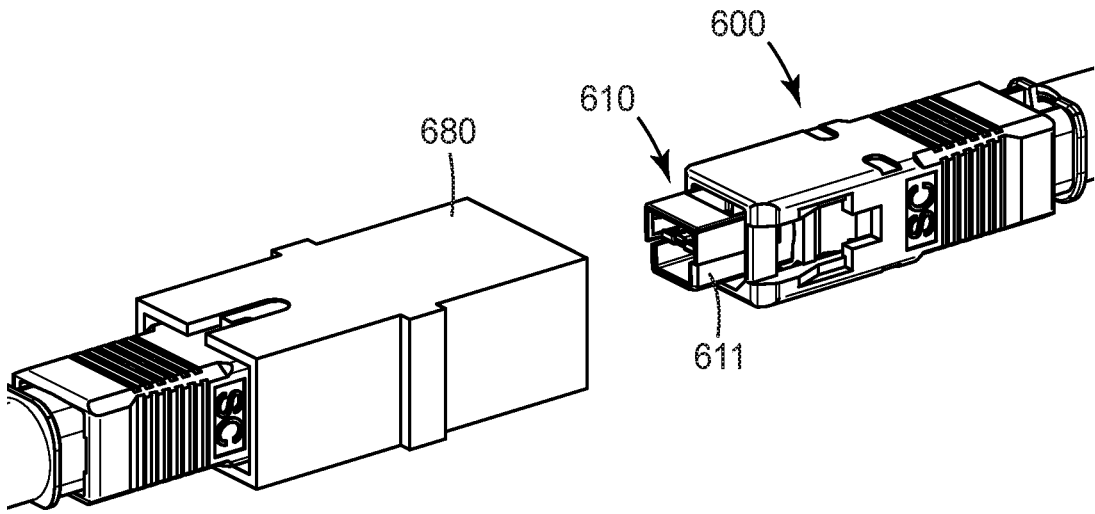
FIGS. 6A-6B are front and rear perspective views of an optical connector assembly disposed proximate a snap-in connector (SC) adaptor.
Figure 6B:
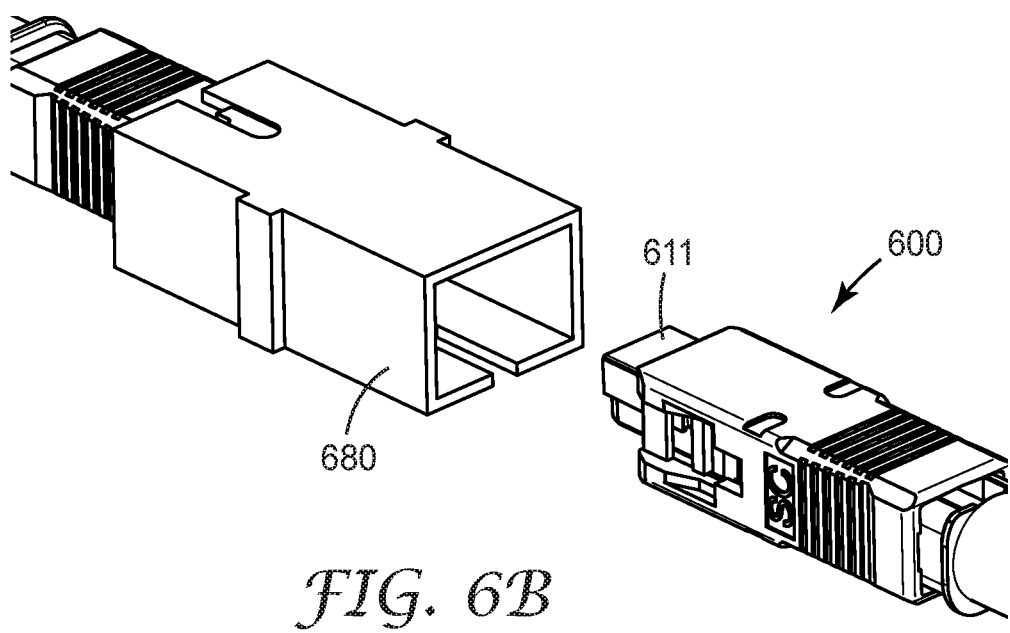

FIGS. 6A-6B are front and rear perspective view of optical connector assembly 600 disposed proximate a snap-in connector (SC) adaptor 680. Optical connector assembly 600 may correspond to optical connector assembly 100 or 300, for example. In some embodiments, the mating end 611 of the housing 610 is configured to be removably inserted into the snap-in connector (SC) adaptor 680.

Figure 7A:
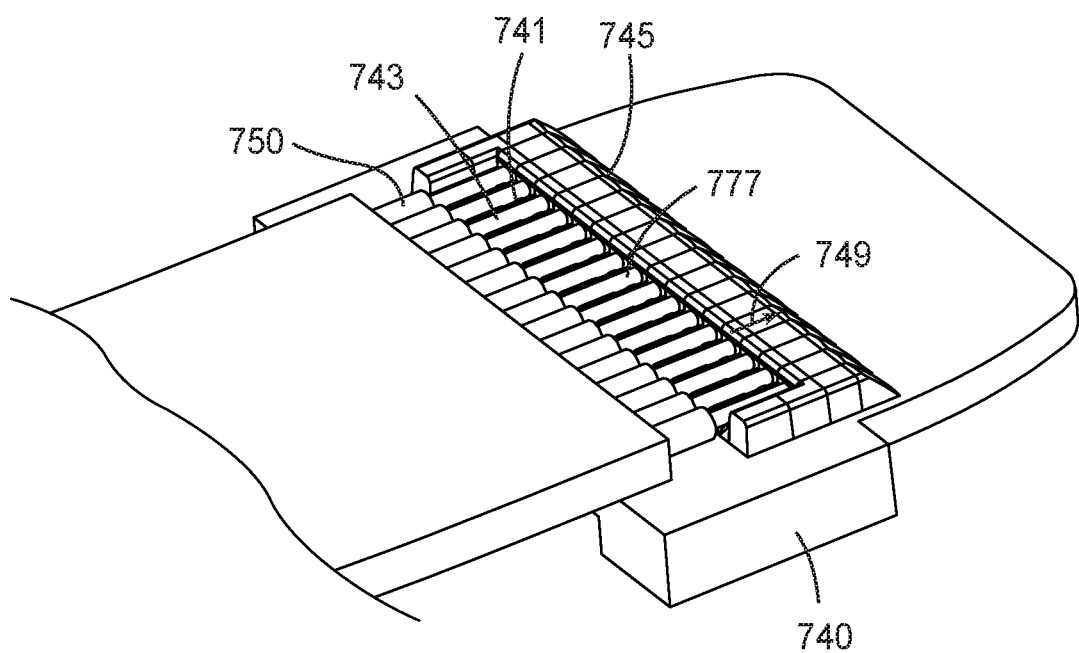
FIG. 7A is a top perspective view of an optical ferrule.
Figure 7B:
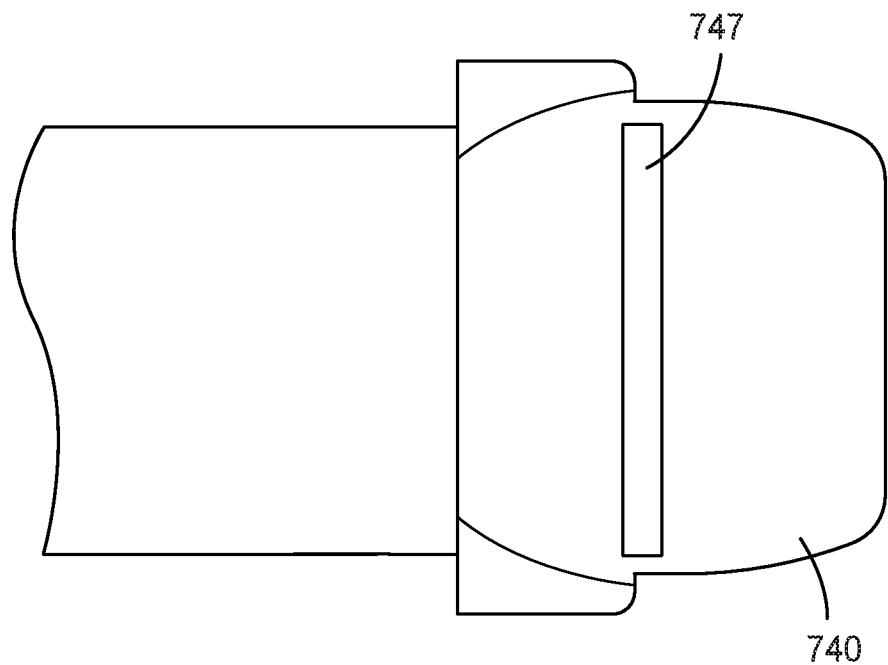
FIG. 7B is a bottom view of the optical ferrule of FIG. 7A.

FIGS. 7A-7B are a top perspective view and bottom view, respectively, of an optical ferrule 740 which may correspond to any of the optical ferrules described elsewhere herein. Optical ferrule 740 includes an attachment area 741 for receiving a plurality of optical fibers 743 and includes a light redirecting side 745 for changing a direction of light 749 received from an optical fiber received in the attachment area 741. The direction of light 749 is changed so that the light 749 exits a light output surface 747 of the optical ferrule 740. Optical fiber array 750 includes the plurality of optical fibers 743. Front ends 777 of the optical fibers 743 are received by and fixedly attached to the attachment area 741 of the optical ferrule 740.

Figure 7C:
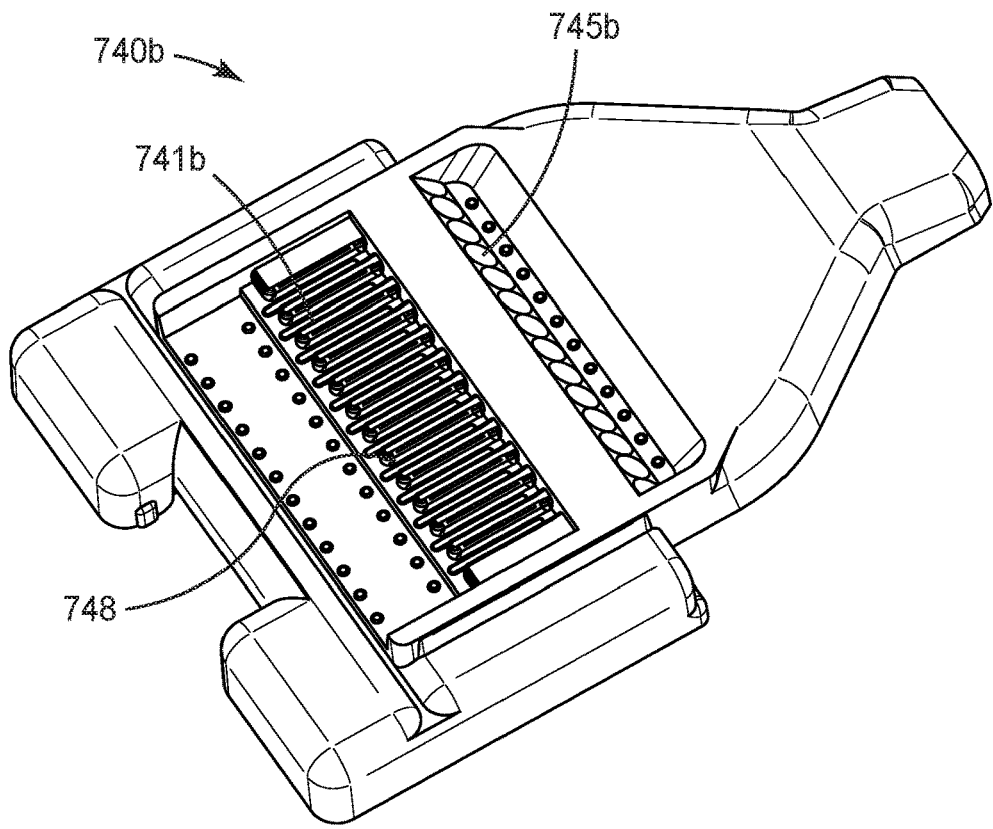
FIG. 7C is a top perspective view of another optical ferrule.
Figure 7D:
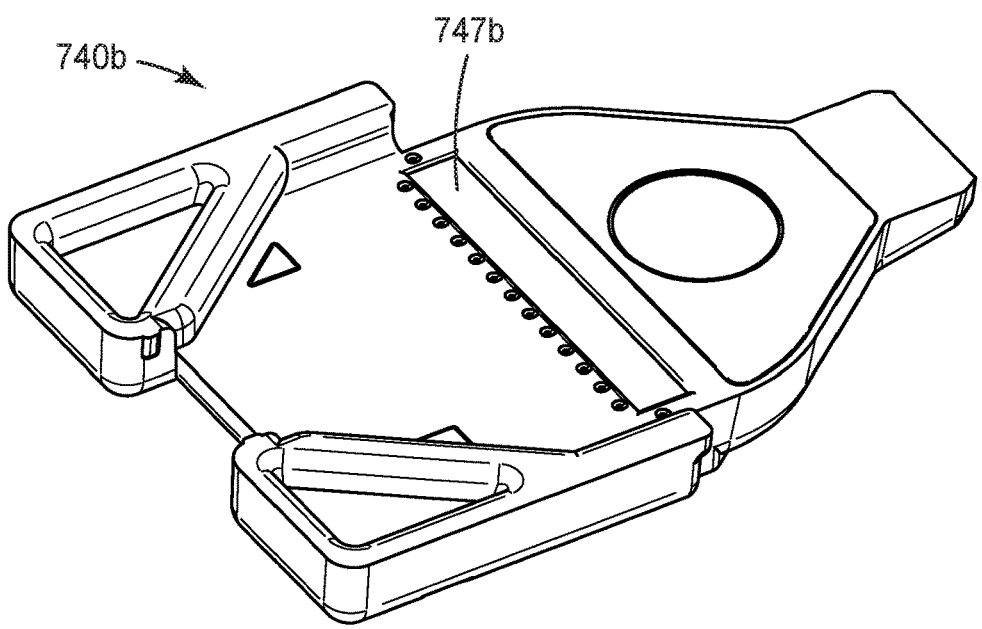
FIG. 7D is a bottom perspective view of the optical ferrule of FIG. 7C.

Other optical ferrules may be used. FIG. 7C-7D are top and bottom perspective views of optical ferrule 740b which includes an attachment area 741b including a plurality of grooves 748 for receiving a plurality of optical fibers and includes a light redirecting side 745b for changing a direction of light received from an optical fiber received in the attachment area 741b. The direction of light is changed so that the light exits a light output surface 747b of the optical ferrule 740b. Other optical ferrules that may be used are described in in Prov. Appl. No. 62/806,146 titled "Optical Ferrule" and filed on Feb. 15, 2019, in Prov. Appl. No. 62/691,871 titled "Optical Ferrule Having Compound Stops" and filed on Jun. 29, 2018, and in Prov. Appl. No. 62/691,477 titled "Light Coupling Element and Assembly" and filed on Jun. 28, 2018, for example.

The first and second housing portions of any of the optical assemblies described herein can be made by molding or machining, for example. In some embodiments, each of the first and second housing portions are made by injection molding a thermoplastic material. Any of the optical ferrules of the present description can similarly be made by molding (e.g., injection molding) or machining, for example. In some embodiments, the optical ferrule is unitary. In some embodiments, the optical ferrule is hermaphroditic.

Optical connectors and optical ferrules are described in U.S. Pat. Appl. Publ. Nos. 2015/0247979 (Richmond et al.), 2018/0128996 (Sawicki et al.), 2018/0239091 (Mathews et al.), 2018/0275353 (Haase et al.), and 2019/0049671 (Haase et al.), for example.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical connector assembly, comprising:
   a housing having a mating end and an opposite cable end, and comprising:
      a unitary first housing portion comprising a front support proximate the mating end and a rear support disposed between the front support and the cable end; and
      a unitary second housing portion assembled to the first housing portion and comprising a middle support disposed between the front and rear supports of the first housing portion;
   an optical ferrule supported by the front support of the first housing portion and comprising:
      an attachment area for receiving a plurality of optical fibers; and
      a light redirecting side for changing a direction of light received from an optical fiber received in the attachment area; and
   a substantially flat optical fiber array comprising a plurality of optical fibers, front ends of the optical fibers received by and fixedly attached to the attachment area of the optical ferrule, the optical fiber array fixedly attached to the rear support of the first housing portion, such that when the second housing portion is assembled to the first housing portion, the middle support of the second housing portion contacts and bends the optical fiber array about the middle support, the bend causing the optical ferrule to rotate about the front support of the first housing portion.

2. The optical connector assembly of claim 1, wherein the mating end of the housing is configured to be removably inserted into a multi-fiber push on (MPO) adaptor.

3. The optical connector assembly of claim 1, wherein the mating end of the housing is configured to be removably inserted into a fiber-optic connector (FC) adaptor.

4. The optical connector assembly of claim 1, wherein the mating end of the housing is configured to be removably inserted into a snap-in connector (SC) adaptor.

5. The optical connector assembly of claim 1, wherein the mating end of the housing is configured to be removably inserted into an optical backplane adaptor.

6. The optical connector assembly of claim 1 further comprising:
   a second substantially flat optical fiber array comprising a plurality of optical fibers; and
   a second optical ferrule disposed in the housing proximate the mating end, the second optical ferrule comprising:
      an attachment area for receiving a plurality of optical fibers, front ends of the optical fibers of the second optical fiber array received by and fixedly attached to the attachment area of the second optical ferrule; and
      a light redirecting side for changing a direction of light received from an optical fiber received in the attachment area of the second optical ferrule.

7. The optical connector assembly of claim 6, wherein the unitary first housing portion further comprises a second front support proximate the mating end and a second rear support disposed between the second front support and the cable end, the second optical fiber array fixedly attached to the second rear support of the first housing portion, the unitary second housing portion further comprising a second middle support disposed between the second front and second rear supports of the first housing portion, such that when the second housing portion is assembled to the first housing portion, the second middle support of the second housing portion contacts and bends the second optical fiber array about the second middle support, the bend in the second optical fiber array causing the second optical ferrule to rotate about the second front support of the first housing portion.

8. The optical connector assembly of claim 6, wherein the housing further comprises:
a unitary third housing portion comprising a front support proximate the mating end and a rear support disposed between the front support and the cable end, the second optical ferrule being supported by the front support of the third housing portion; and
a unitary fourth housing portion assembled to the third housing portion and comprising a middle support disposed between the front and rear supports of the third housing portion, such that when the fourth housing portion is assembled to the third housing portion, the middle support of the fourth housing portion contacts and bends the second optical fiber array about the middle support of the fourth housing portion, the bend causing the second optical ferrule to rotate about the front support of the third housing portion.

9. The optical connector assembly of claim 1, the first housing portion further comprises a first opening for receiving a mating optical ferrule and a different second opening facing a light output surface of the optical ferrule.

10. The optical connector assembly of claim 1, wherein the optical fiber array is attached to a collet, the collet being attached to the rear support of the first housing portion, the collet being substantially centered in the first housing portion along a first direction orthogonal to a mating direction of the optical connector assembly and along a second direction orthogonal to the mating and first directions.

11. The optical connector assembly of claim 1, wherein the optical fiber array is attached to a collet, the collet being attached to the rear support of the first housing portion, the collet retaining portions of the optical fibers in the collet such that the retained portions extend in a direction substantially parallel to a mating direction of the optical connector assembly.

12. The optical connector assembly of claim 1, wherein the optical fiber array is attached to a collet, the collet being attached to the rear support of the first housing portion, the collet retaining portions of the optical fibers in the collet such that the retained portions extend in a direction making an oblique angle with a mating direction of the optical connector assembly.

13. The optical connector assembly of claim 1, wherein the optical fiber array is attached to a collet, the collet being attached to the rear support of the first housing portion, the optical fibers have a length d1 between the optical ferrule and the middle support and a length d2 between the middle support and the collet, d1<d2.

14. An optical connector assembly, comprising:
a housing having a mating end and an opposite cable end, and comprising:
a front support proximate the mating end;
a rear support disposed between the front support and the cable end; and
a middle support disposed between the front and rear supports and configured to move between first and second positions;
an optical ferrule adjacent the front support of the housing and comprising:
an attachment area for receiving a plurality of optical fibers; and
a light redirecting side for changing a direction of light received from an optical fiber received in the attachment area; and
a substantially flat optical fiber array comprising a plurality of optical fibers, front ends of the optical fibers received by and fixedly attached to the attachment area of the optical ferrule, the optical fiber array fixedly attached to the rear support of the housing, such that when the middle support moves from the first position to the second position, the middle support contacts and bends the optical fiber array about the middle support, the bend causing the optical ferrule to rotate about the front support of the housing.

15. The optical connector assembly of claim 14, wherein the housing comprises a unitary cover portion and a unitary first housing portion comprising the front and rear supports, such that when the middle support is in the first position and the unitary cover portion is assembled to the unitary first housing portion, the unitary cover portion moves the middle support to the second position.

\* \* \* \* \*